(12) United States Patent
Suzuki et al.

(10) Patent No.: US 6,489,725 B1
(45) Date of Patent: Dec. 3, 2002

(54) POWER SAVING CIRCUIT

(75) Inventors: Kenichi Suzuki, 20-1, Fujimino 2-chome, Hiratsuka-shi, Kanagawa 259-1211 (JP); Yasuhiro Sonoda, Atsugi (JP); Eremiya Suzuki, Hiratsuka (JP)

(73) Assignee: Kenichi Suzuki, Kanagawa (JP)

( * ) Notice: Subject to any disclaimer, the term of this patent is extended or adjusted under 35 U.S.C. 154(b) by 0 days.

(21) Appl. No.: 09/786,803

(22) PCT Filed: Sep. 6, 1999

(86) PCT No.: PCT/JP99/04818

§ 371 (c)(1),
(2), (4) Date: Mar. 7, 2001

(87) PCT Pub. No.: WO00/14850

PCT Pub. Date: Mar. 16, 2000

(30) Foreign Application Priority Data

| Sep. 7, 1998 | (JP) | 10-291280 |
| Oct. 16, 1998 | (JP) | 10-331858 |
| Jan. 8, 1999 | (JP) | 11-40467 |
| Feb. 13, 1999 | (JP) | 11-74295 |

(51) Int. Cl.⁷ .......................................... H05B 37/02
(52) U.S. Cl. .................... 315/159; 315/158; 315/209 R
(58) Field of Search .................. 315/155, 156, 315/158, 159, 194, 209 R, 291, 30.7, DIG. 4; 307/117

(56) References Cited

U.S. PATENT DOCUMENTS

| 4,066,930 A | * | 1/1978 | Summa | 315/209 R |
| 5,498,931 A | * | 3/1996 | Bedocs | 315/159 |
| 6,369,517 B2 | * | 4/2002 | Song et al. | 315/159 |

FOREIGN PATENT DOCUMENTS

| JP | 2-500080 | 1/1990 |
| JP | 11-103541 | 4/1999 |

* cited by examiner

Primary Examiner—Don Wong
Assistant Examiner—Jimmy T. Vu
(74) Attorney, Agent, or Firm—Kilpatrick Stockton, LLP

(57) ABSTRACT

A power saving circuit is to save standby power of electronic devices. A capacitor (1) is connected to an AC power supply (6), and a phase-leading current component passing the capacitor is used to make a DC power supply (10), as a power supply when in standby. In case an infrared command is used, the capacitor is connected in parallel to another capacitor (3) to strengthen the current output capability of the DC power supply, having an AC switching element (4) maintained in on state.

31 Claims, 20 Drawing Sheets

POWER SUPPLY C162

POWER SUPPLY C172

POWER SUPPLY C182

POWER SAVING CIRCUIT

TECHNICAL FIELD

The present invention relates to a power saving circuit for reducing standby power in electronic devices.

BACKGROUND ART

Power is needed in setting electronic devices to standby so that they can operate at any time.

For example, an infrared remote control device requires power to keep its light-receiving section active.

This standby power for electronic devices is obtained from a transformer or a switching regulator.

For this reason, many electronic devices consume power of, for example, approximately 2 W to 35 W without a break during the standby period.

The present invention aims to provide a power saving circuit for effectively reducing standby power of such electronic devices and maintaining a power saving state of, for example, approximately 2 mw to 40 mw.

The present invention aims to provide such a power saving circuit as a unit.

DISCLOSURE OF INVENTION

The present invention is a power saving circuit having a circuit constitution wherein a capacitor is connected with an AC power supply, a DC power supply is created from the charge moving between this capacitor and the AC power supply, and standby power for an electronic circuit is obtained from this DC power supply.

According to the present invention, the phase-leading current component flowing through the capacitor can be used as standby power. Furthermore, it also has a protective effect when excess voltage arrives.

The power saving circuit may be comprised as a power saving unit, and this unit may be a module type which is contained in the electronic device or an adaptor type which is externally connected to the electronic device.

In case of control such as by an infrared command, the circuit constitution may be one wherein the capacitor is connected in parallel with another capacitor to increase the current output capability of the DC power supply, and an AC switching element is turned on by the power from this supply.

BEST MODE FOR CARRYING OUT THE INVENTION

Preferred embodiments of the present invention will be explained with reference to the diagrams. Same elements in the embodiments are represented with same reference codes to facilitate understanding of the explanation.

Figure 1:
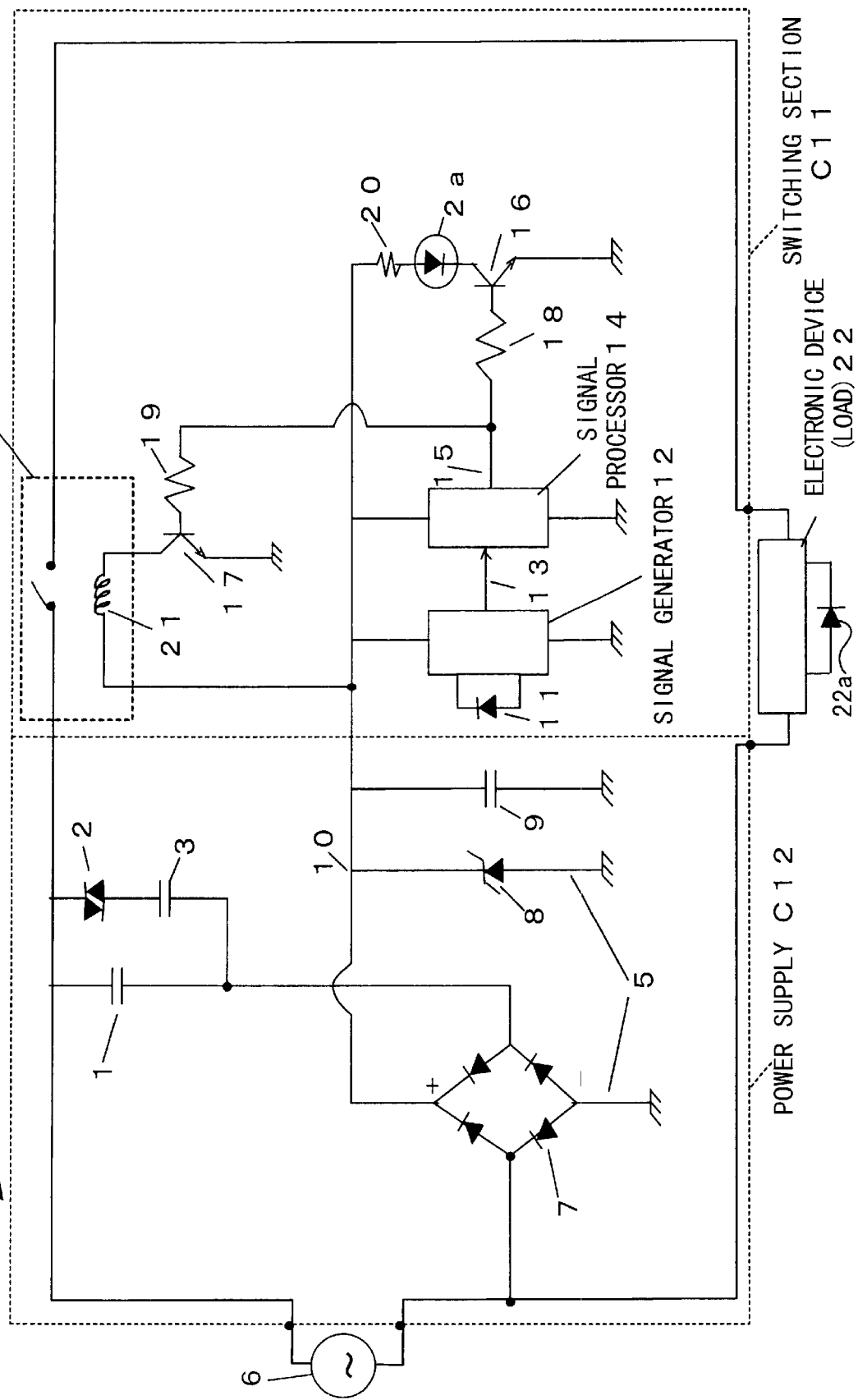
FIG. 1 is a circuit diagram of an externally connecting power saving circuit according to an embodiment of the present invention.

FIG. 1 shows a power saving circuit C1 according to an embodiment of the present invention.

This power saving circuit C1 is an adaptor unit connected between an AC power supply 6 and an electronic device 22 as a load that receives the supply during operation.

The power saving circuit C1 comprises a switching section C11 which performs a switching for selection between a standby mode and an operate mode, and a power section C12 which supplies power to the switching section C11.

Firstly, the circuit constitution of the power section C12 will be explained.

The power section C12 comprises a circuit having a constitution wherein one terminal of a capacitor 1 connects to one pole of the AC power supply 6, the other terminal of the capacitor 1 connects to one terminal of the AC side of a rectifying bridge 7, and the other terminal of the AC side of the rectifying bridge 7 connects to the other pole of the AC power supply 6; a circuit comprising a Zener diode 8 and another capacitor 9 which are connected in parallel between the positive pole (+) terminal and negative pole (−) terminal (in this case, ground 5) of the DC side of the rectifying bridge 7; and a circuit comprising a further capacitor 3 connected in series with a phototriac 2 which functions as the continuity switch thereof, these being connected in parallel with the capacitor 1.

Subsequently, the circuit constitution of the switching section C11 will be explained.

The switching section C11 comprises an ON/OFF controller having a signal generator 12 as an infrared light-receiving section comprising a photodiode 11, which receives infrared light signals from the outside, and a signal processor 14 which processes the AC electrical signal 13 from the signal generator 12 and outputs a DC signal 15; and an ON/OFF operating section having transistors 16 and 17 as a pair of switches which turn ON after receiving the DC signal 15 from the signal processor 14, an LED (light-emitting diode) 2a which emits light when the switch 16 turns ON and thereby switches the phototriac 2 provided in the power section C12 to ON, and an electromagnetic relay 4 as a switching element which closes the AC power supply circuit to the load 22 when the other transistor 17 turns ON. 18 and 19 are base resistors of the transistors 16 and 17, 20 is a current-limiting resistor of the LED 2a, and 21 is an excitation coil of the relay 4.

Subsequently, the operation of the power saving circuit C1 will be explained.

Charge moves between the corresponding pole plates of the capacitor 1 and the poles of the AC power supply 6, whereby AC current is generated. When this AC current flows between the AC power supply 6 and the capacitor 1, it is rectified by the rectifying bridge 7. This rectification charges a charge equivalent to the Zener voltage of the Zener diode 8 to the capacitor 9, thereby functioning as a DC power supply for the switching section C11.

When the photodiode 11 receives the infrared signal comprising as an AC signal, the signal generator 12 generates an AC electrical signal 13 which is input to the signal processor 14.

The signal generator 12 is a band amplifier which selectively amplifies the modulating light which cuts on and off at rapid frequency among the signal elements of the infrared light radiated to the photodiode 11. The infrared light command which has been modulated by the modulating light is output as the signal 13.

The signal processor 14 processes the AC electrical signal 13 and outputs a DC signal 15. The DC signal 15 is supplied to the bases of the pair of transistors 16 and 17, thereby switching the transistors 16 and 17 to ON.

When the transistor 16 is switched ON by the DC signal 15, the LED 2a emits light and the phototriac 2 turns to ON. When the phototriac 2 turns to ON, the AC current passing between the phototriac 2 and the capacitor 3 flows from the AC power supply 6 and is also supplied to the rectifying bridge 7. Consequently, the current output capability of the DC power supply 10 is increased, and the light-emission of the LED 2a and the excitation of the control coil 21 are maintained appropriately. That is, the necessary current flows continuously from the DC power supply 10 to the LED 2a and the coil 21. When the relay 4 becomes ON, the AC voltage of the AC power supply 6 is supplied to the electronic device 22, placing the electronic device 22 in standby state. This electronic device 22 contains an infrared signal light-receiving processor comprising a photodiode 22a, and when it has received the ON command by infrared signal, it shifts from standby state to operating state.

When the photodiode 11 of the power saving circuit C1 receives an OFF command, the transistors 16 and 17, the LED 2a and the relay 4 of the switching section C11 turn to OFF by a reverse operation to that described above. The phototriac 2 of the power section C12 also turns OFF, and the circuit C1 returns to standby mode.

In the power saving state where the relay 4 has turned OFF, the AC power supply 6 is not supplied to the electronic device 22, and the capacitors 1 and 3, the phototriac 2, the LED 2a, and the relay coil 21 do not consume power. Therefore, the power consumption in the standby mode of the power saving circuit C1 is equivalent to a circuit section which the above elements (1, 3, 2, 2a and 21) have been removed from (in particular, the latter-stage circuits 12 and 14 of the DC power supply 10 and the Zener diode 8) and is measured to be very small amount between 2 mw to 40 mw.

Since the phase of the AC current passing through the capacitor is 90 degrees ahead of the terminal voltage of the capacitor, no power is consumed.

The power saving circuit C1 of FIG. 1 may be incorporated inside the electronic device 22. In that case, the number of photodiodes may be reduced by giving the photodiode 22a the function of the photodiode 11.

Figure 2:
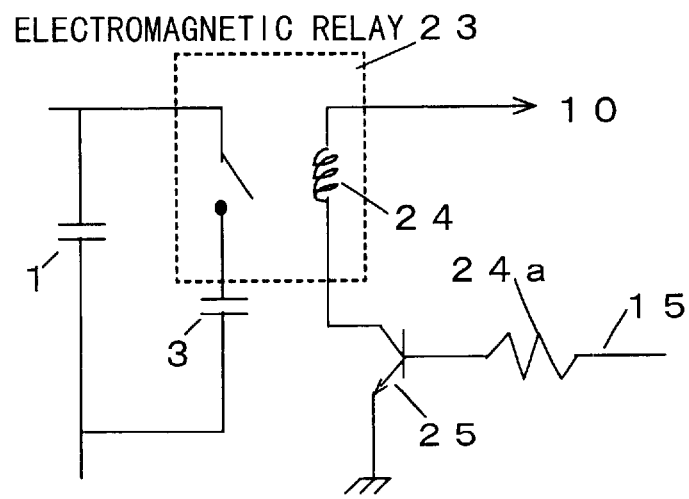
FIGS. 2 to 5 are circuit diagrams showing commonly applicable modifications of essential parts of the power saving circuit of FIG. 1.

FIG. 2 shows a modification in which the switch element (phototriac 2) provided in the power section C12 is configured as an electromagnetic relay 23.

An excitation coil 24 of the electromagnetic relay 23 is switched ON by a DC signal 15 which is supplied to the transistor 25 via a base resistor 24a.

Figure 3:
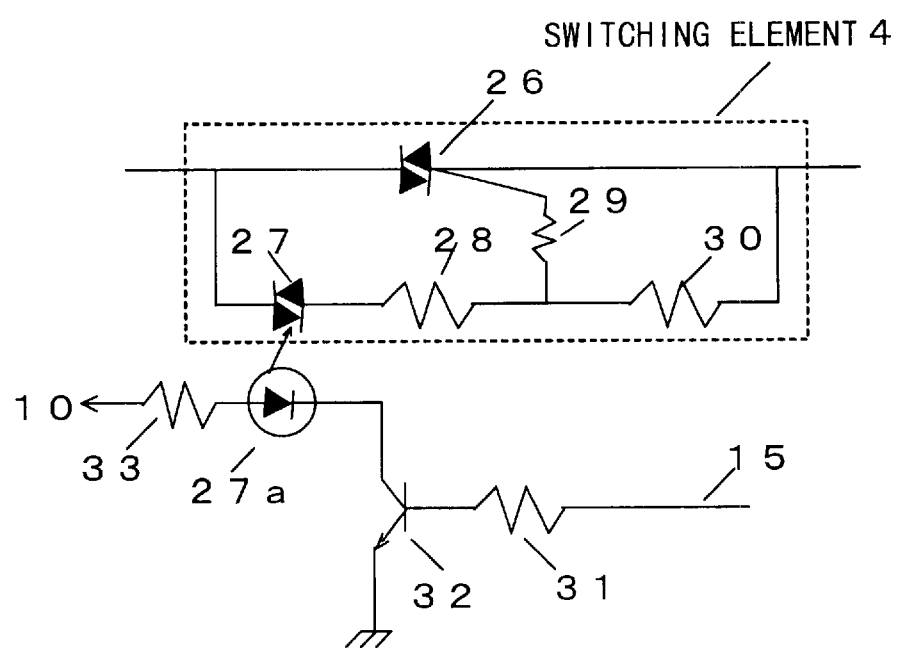

FIG. 3 shows a modification in which the switching element (electromagnetic relay) 4 of the switching section C11 comprises a combination of a triac 26, a phototriac 27, and resistors 28, 29, and 30.

The light-emitting side LED 27a of the phototriac 27 emits light when the transistor 32 is switched ON by the DC signal 15 which has been input to the base via the resistor 31, turning the phototriac 27 to ON. 33 is a resistor which restricts current from the DC power supply 10.

When the DC signal 15 rises to the high level, the transistor 32 is switched ON via the resistor 31 and the light-emitting side LED 27a of the phototriac is switched ON. The triac 26 switches to ON when a current determined by the resistors 28, 29, and 30 flows to its gate.

Figure 4:
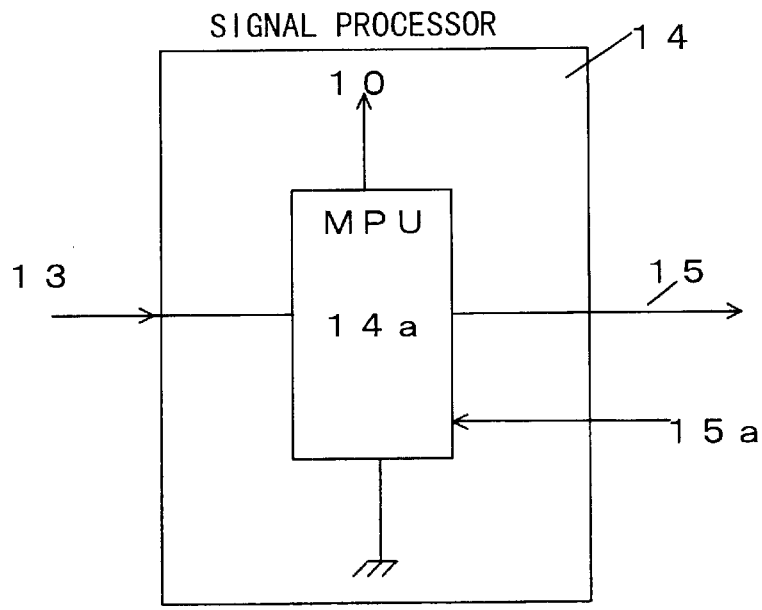

FIG. 4 shows a modification of the signal processor 14 of the switch section C1.

When an AC signal 13 is input to an MPU (microprocessor unit) 14a, the MPU 14a interprets the content of the signal 13 and outputs a high or low DC signal 15 accordingly. Reference numeral 15a represents an input signal representing interpretation conditions. When this is input, the MPU 14a outputs a low DC signal 15.

Figure 5:
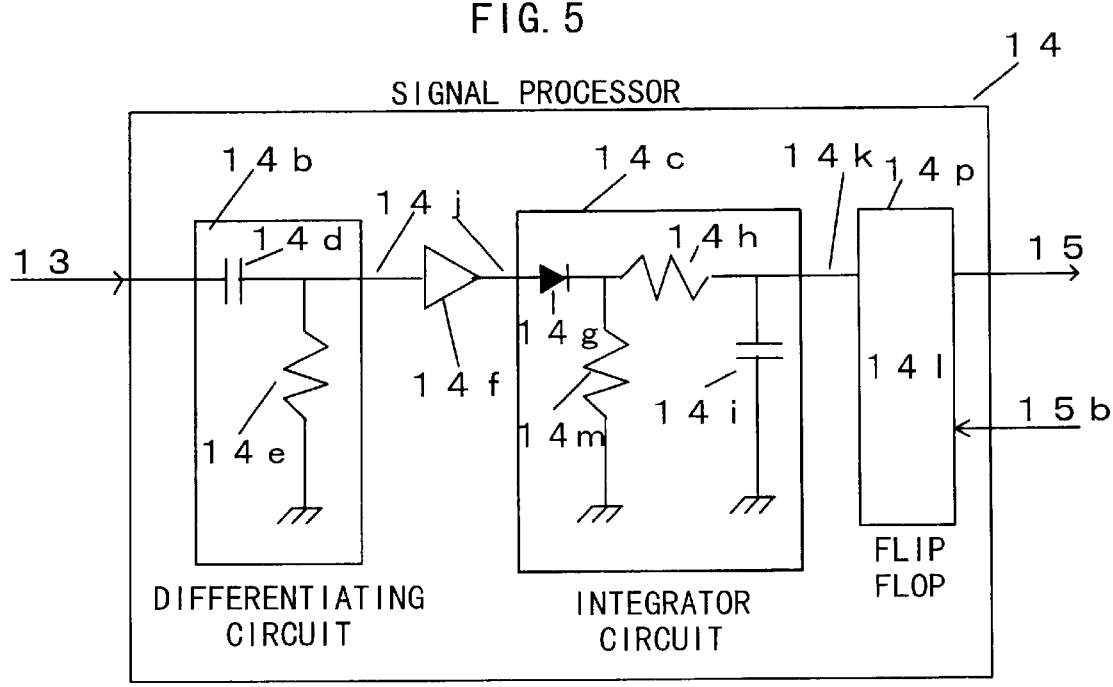

FIG. 5 shows a modification of the signal processor 14 of the switching section C11.

The signal processor 14 comprises a differentiating circuit 14b, a buffer 14f, an integrator circuit 14c, and a flipflop 14p.

The AC signal 13 is received by the signal processor 14 and input to the differentiating circuit 14b. The differentiating circuit 14b extracts a signal 14j comprising AC elements from the signal 13 which are above a predetermined frequency, and inputs it to the buffer 14f. 14d is a capacitor, and 14e is a resistor.

After leaving the buffer 14f, the signal 14j is integrated by the integrator circuit 14c, which comprises a diode 14g, a resistor 14h and a capacitor 14i, thereby becoming a DC signal 14k, and enters the flipflop 14p.

The flipflop 14p detects the rise of the input signal 14k and shifts the DC signal 15 to high. 14m is a discharge resistor.

A reset signal 15b is input to the flipflop 14p. When the reset signal 15b is high, the flipflop 14p is reset and the DC signal 15 falls to the low level. Consequently, the signal 15 can be made high when the AC portion of the infrared light has continued for a predetermined period of time, irrespective of the specific infrared command.

Figure 6:
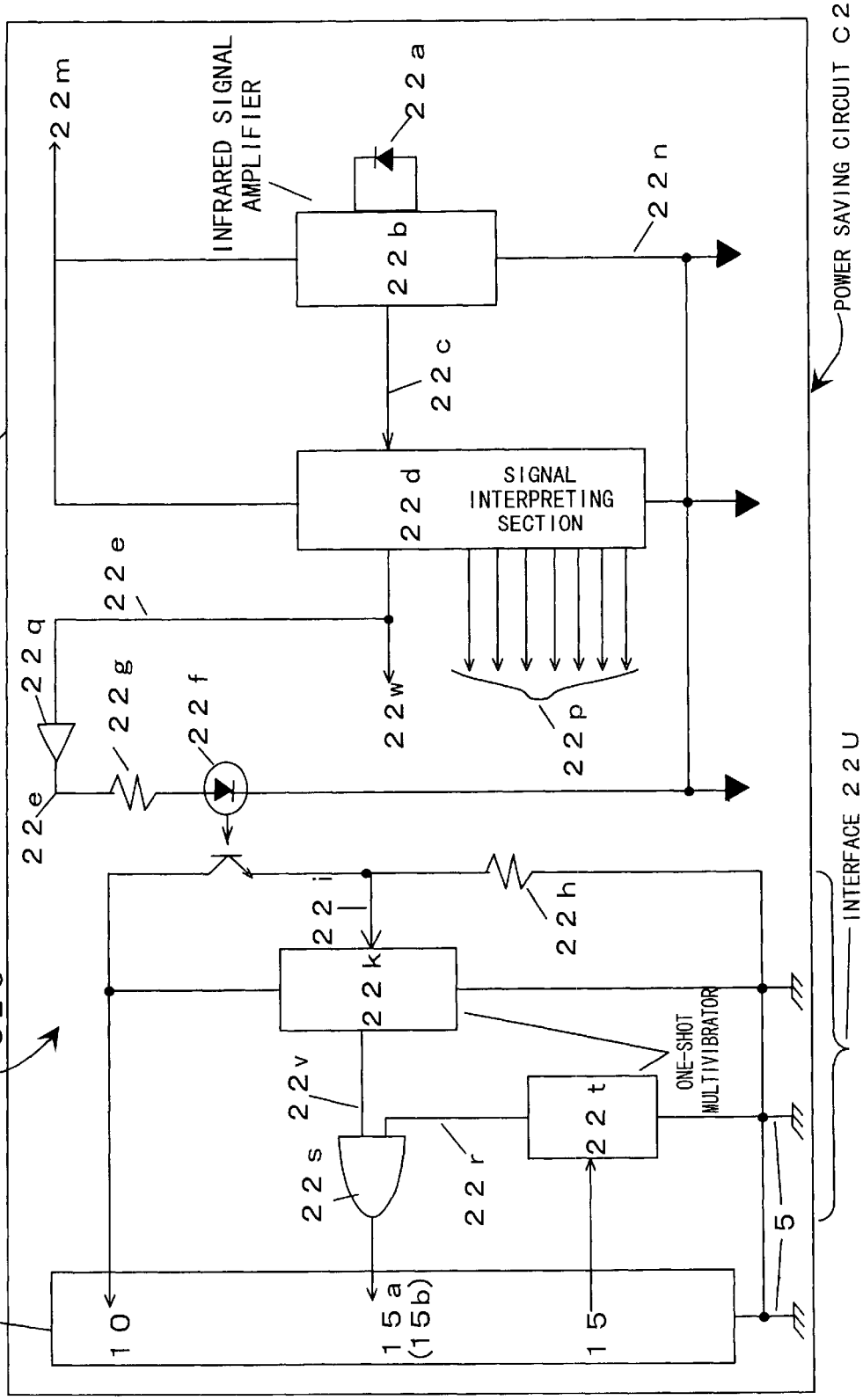
FIG. 6 is a circuit diagram of an internal power saving circuit according to another embodiment of the present invention.

FIG. 6 shows an internal power saving circuit C2 according to another embodiment of the present invention.

This power saving circuit C2 comprises a power saving module C20, formed by arranging the power saving circuit C1 of FIG. 1 as an internal module, and a support module C23 which acts together with the module C20 to support power saving. The power saving circuit C23 is provided inside the electronic device 22.

The support module C23 comprises an infrared signal amplifier 22b comprising a photodiode 22a; a signal interpreting section 22d which interprets the command content of the command 22c, sent as infrared modulated light from the infrared signal amplifier 22b, and outputs a signal 22e at the corresponding level; and an interface 22u which is provided between the signal interpreting section 22d and the power saving module C20, for receiving and processing the DC signal 15 and creating and transmitting the reset signal 15a.

The signal interpreting section 22d comprises an MPU or a signal-interpreting IC. When a command signal 22c received from the infrared signal amplifier 22b is a remote control ON command, the signal interpreting section 22d makes the level signal 22e high, and makes it low when the ON command is received a second time. The signal 22e is input to a buffer 22q.

When the signal 22e becomes high, a photocoupler 22f switches to ON, and the DC power supply 10 is supplies from the power saving module C20 to a resistor 22h. In correspondence therewith, the signal 22i changes from low to high. The signal 22i changes from high to low when the photodiode 22a receives an ON command a second time and the signal 22e becomes low.

A one-shot multivibrator 22k detects the edge when the signal 22i changes from high to low, and outputs a pulse signal 22v first at the high level then subsequently at the low level. The pulse signal 22v is used as the reset signal 15a in the modification of FIG. 4, or as the reset signal 15b in the modification of FIG. 5.

When the AC power supply 6 (FIG. 1) is not being supplied via the power saving module C20 to the electronic device 22, or when the photodiode 22a of the electronic device 22 has received an ON command for the first time, the pulse signal 22v keeps the low state.

Then, when the photodiode 22a has received the next ON command, the reset signal 15a or 15b is generated at the high level then subsequently returning to the low level. The MPU 14a of FIG. 4 or the flipflop 14p of FIG. 5 is reset, whereby the switching elements 2 and 4 become OFF, and the power saving state is reached during which the AC power supply 6 is no longer supplied to the electronic device 22. The signal 22v is supplied to the power saving module C20 as a pulse-like reset signal 15a or 15b which has passed an AND IC 22s.

When the electronic device 22 changes from the power saving state to the standby state, in a VTR and the like, the signal 22e rises to the high level for a few seconds and returns to low and the standby state after passing through the operating state.

When this operating state of a few seconds is detected, reset pulses 15a and 16b are generated.

To prevent the reset pulses 15a and 16b from being generated, a signal 22r is input to one of the input terminals of the AND IC 22s. Furthermore, the signal 15 is input to the one-shot multivibrator 22t and the signal 22r is made low for a few seconds when the signal 15 has changed from low to high. In other cases, since the signal 22r is high, the signal 22v becomes the reset signal 15a and 15b.

When the photodiode 22a receives a second ON command, the electronic device 22 is returned from the operating state to the standby state by a signal 22w which is identical to the signal 22e. Moreover, the action of the power saving module C20 returns the electronic device 22 from the standby state to the AC power supply OFF state, i.e. the power saving state (2 mw to 40 mw).

Subsequently, when an infrared command is radiated from an infrared remote controller to the electronic device 22 which is in the power saving state, the command is received by the photodiode 11 (FIG. 1) inside the power saving module C20. As a result, the switching elements 2 and 4 switch to ON as described above, and the electronic device 22 changes to the standby state.

The power saving module C20 may be provided inside the electronic device 22 as shown in FIG. 6, or as an externally-attached adaptor outside the electronic device 22 as shown in FIG. 1. The same goes for all subsequent embodiments.

The signal interpreting section 22d outputs signals 22p corresponding to all types of commands other than the ON command from a built-in MPU. These signals 22p are used in the electronic device 22.

A DC power supply 22m and the ground 22n thereof are provided inside the electronic device 22, and are insulated from the AC power supply 6. The DC power supply 10 and the ground 5 thereof are provided inside the power saving module C20 (or the externally-attached adaptor power saving circuit C1) and Bare not insulated from the AC power supply 6. The photocoupler 22f insulates the DC power supply 10 and the ground 5 form the DC power supply 22m and the ground 22n.

Figure 7:
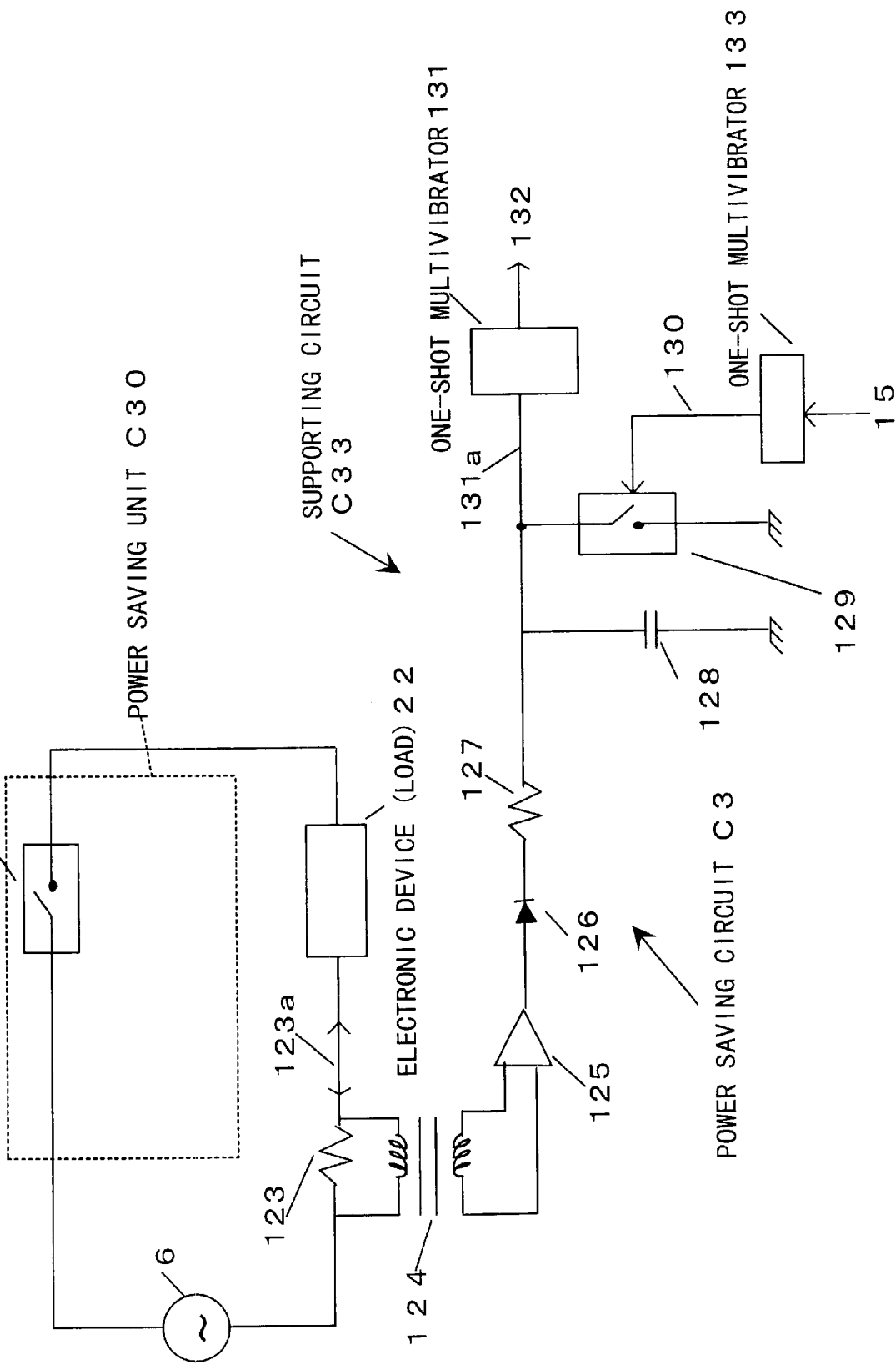
FIG. 7 is a circuit diagram of a power saving circuit according to another embodiment of the present invention.

FIG. 7 shows a power saving circuit C3 according to another embodiment of the present invention.

The power saving circuit C3 comprises a power saving unit C30, which is formed by arranging the power saving circuit C1 of FIG. 1 in a unit as an externally attached adaptor (or an internal module as in FIG. 2), and a supporting circuit C33 which act together with the power saving unit C30 and supports power saving.

The supporting circuit C3 has a circuit constitution wherein a resistor for measuring current 123 of approximately 0.1 Ω is provided on the wire which AC current 123a flows along to the electronic device 22. A voltage is generated at both ends of the resistor for measuring current 123 and is amplified by an amplifier 125 with a transformer 124 provided therebetween. Thereafter, a diode 126, a resistor 127, and a capacitor 128 integrate the voltage to obtain a signal 131a, which is controlled by a switching element 129.

The amplification rate of the amplifier 25 is set so that the signal 131a rises to high when the electronic device 22 changes from the standby state to the operating state.

When the electronic device 22 has returned to the standby state from the operating state, the signal 131a changes from high to low. A one-shot multivibrator 131 detects the edge of this change from high to low and generates a pulse 132. The pulse 132 changes from low to high, and returns to low.

When the switching elements 2 and 4 are switched OFF by using this pulse 132 as the reset signal 15a of FIG. 4 or the reset signal 15b of FIG. 5, the AC power supply 6 is not supplied to the electronic device 22 and the power saving state is reached.

When the electronic device 22 shifts from this power saving state to the standby state in which the switching elements 2 and 4 are ON, in certain types of electronic device such as, for, a VTR (video tape recorder) the standby state is reached after a few seconds in the operating state. For this reason, in VTRs and the like, during the few seconds in the operating state when a large current is flowing, the switching element 129 is switched ON and the signal 131a from the capacitor 128 is kept low so that the large current during the operating state is not detected.

After this operating state (less than a few seconds) has ended, when the electronic device 22 returns to the standby state during which a small current is flowing and the switching element 129 is turned OFF, the signal 131a does not rise to high due to the small current. The degree of amplification of the amplifier 125 is adjusted in this way.

Therefore, the power saving unit C30 which has in the power saving state at the start changes to the standby state after receiving an infrared command from the photodiode 11 (FIG. 1). Then, the electronic device 22 changes to the operating state after the photodiode 22a (FIG. 1) receives a first ON command. After operating for longer than a predetermined period of time, the electronic device 22 receives a second ON command and returns to the standby state. The pulse 132 is now generated, whereby the electronic device 22 is reset and returns to the power saving state.

The switching element 129 switches ON and OFF in compliance with the signal 130. The switching element 129 may be a transistor instead of a relay.

The signal 15 is input to the one-shot multivibrator 133. When the signal 15 has risen from low to high, the signal 130 is changed to high for a few seconds, thereby turning the switching element 129 ON and short-circuiting the capacitor 128.

A current transformer may be used instead of the resistor 123 and the transformer 124.

Figure 8:
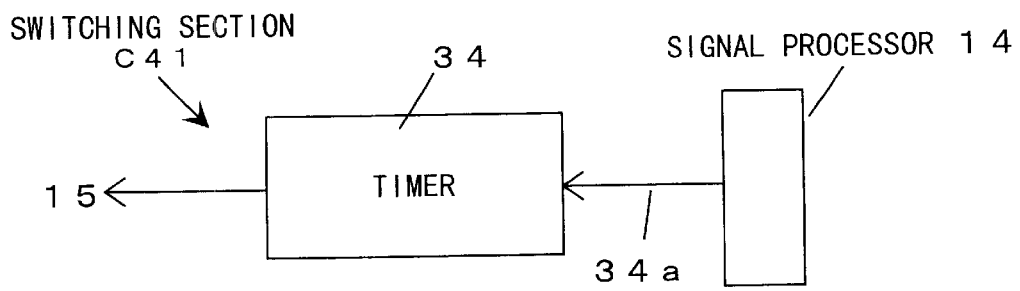
FIG. 8 is a circuit diagram of an essential part of a power saving circuit according to another embodiment of the present invention.

FIG. 8 shows primary parts of a switching section C41 of a power saving circuit according to another embodiment of the present invention.

In the switching section C41, a timer 34 is connected with the signal processor 14 and the output of the timer 34 is used as the signal 15.

The timer 34 starts to operate when the output 34a of the signal processor 14 has dropped from high to low. When a predetermined period of time has elapsed, the signal 15 which was at the high level is changed to the low level. In a cooler and the like, in changing the electronic device 22 which forms the main body of the cooler from the operating state to the standby state, the fan must turn for a fixed period of time in order to discharge heat. Therefore, the timer 34 is set to that time so that the change of the signal 15 and the OFF of the switching elements 2 and 4 are delayed by the predetermined period of time.

Figure 9:
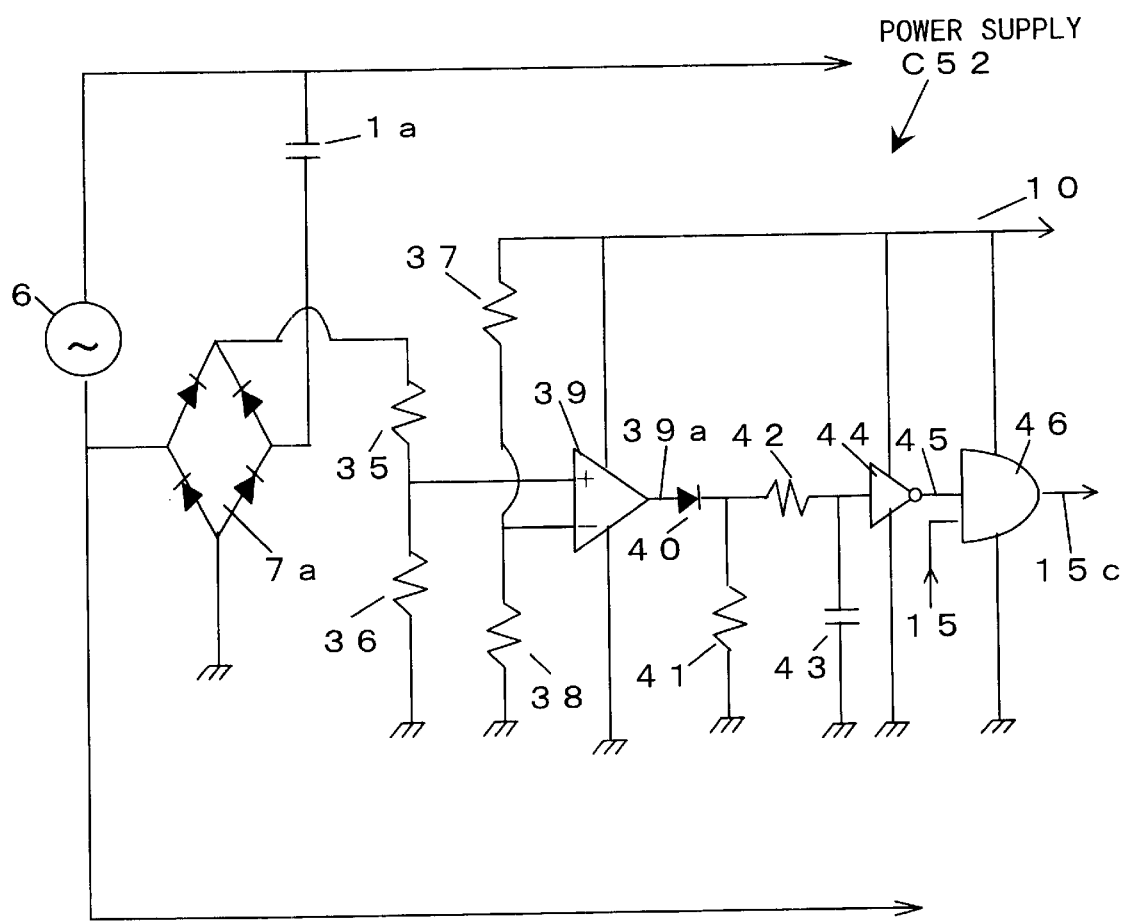
FIG. 9 is a circuit diagram of an essential part of a power saving circuit according to another embodiment of the present invention.

FIG. 9 shows primary parts of a power saving circuit C52 according to another embodiment of the present invention.

In the power section C52, the output terminal voltage of a bridge 7a which rectifies both waves of current flowing between the AC power supply 6 and the capacitor 1a is divided by resistors 35 and 36 and input to the (+) terminal of a comparator 39. The voltage of the DC power supply 10 is divided by resistors 37 and 38 and input to the (−) terminal of the comparator 39.

When the voltage of the AC power supply 6 rises and the (+) terminal of the comparator 39 increases to a higher potential than the (−) input, the output 39a of the comparator 39 becomes high. A capacitor 43 is recharged via a diode 40 and a resistor 42, and the output 45 of an inverter 44 becomes low.

A time constant, determined by resistors 41 and 42 and the capacitor 43, is made sufficiently larger than 10 ms. The capacitor 43 is recharged by the next half-wave portion of the AC current while the capacitor 43 is not discharging a large amount. When the effective value of the AC current exceeds a predetermined value, the output 45 of the inverter 44 becomes low.

This output 45 and the abovementioned signal 15 (FIG. 1) are input to an AND IC 46 and logically integrated. An output 15c (instead of the signal 15 of FIG. 1) of the AND IC 46 is input to the bases of the transistors 16 and 17 (FIG. 1).

When the AC current exceeds the predetermined value, the inverter 45 outputs at the low level. Therefore, irrespective of other conditions, the transistors 16 and 17 and the switching elements 2 and 4 (FIG. 1) turn OFF.

When the AC power supply 6 reaches an overvoltage state, the supply to the electronic device 22 is stopped, protecting the electronic device 22 from overvoltage.

In application to a VTR wherein the video head is preheated, when the built-in software of the MPU 14a of FIG. 4 intermittently raises the signal 15 to the high level, the VTR changes to the standby state when the signal 15 is high and preheats the video head. Consequently, this has the effect of preventing condensation on the video head. Moreover, the VTR changes to the power saving state when the signal 15 is low. For example, by setting the signal 15 to nine hours at the low level after being at the high level for one hour, the standby power can be reduced to approximately one-tenth.

Similar effects can be obtained by inserting a timer between the signal 15 and the flipflop 14p of FIG. 5, and setting the output 15 of the timer to become intermittently high when the output of the flipflop 14p changes to high.

Figure 10:
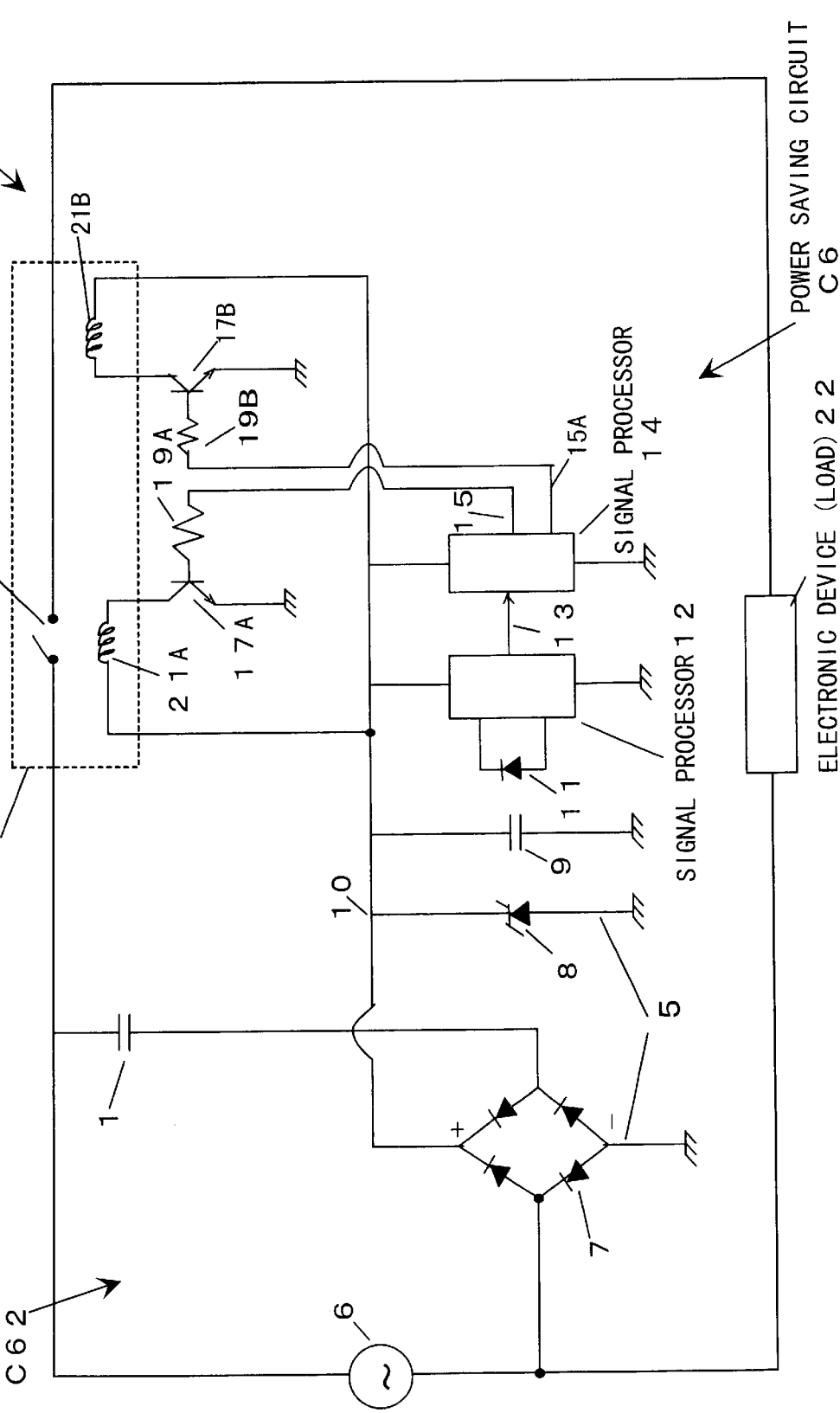
FIG. 10 is a circuit diagram of a power saving circuit according to another embodiment of the present invention.

FIG. 10 shows a power saving circuit C6 according to another embodiment of the present invention.

In the power saving circuit C6, the switching element of the switching section C61 comprises a two-coil latch-type electromagnetic relay 4A.

When the transistor 17A is ON for longer than approximately 10 ms, the set coil 21A of the relay 4A closes the contact point 4C whereby the AC power supply 6 is supplied to the load 22. Furthermore, when the transistor 17B is ON for longer than approximately 10 ms, the reset coil 21B opens the contact point 4C.

The contact point 4C closes when the output signal 15 from the signal processor 14 to the transistor 17A is high for longer than 10 ms. The contact point 4C opens when the output signal to the transistor 17B is high for longer than 10 ms.

A single-coil latch-type relay may be used instead of the two-coil latch-type electromagnetic relay 4A, the electrical path being opened and closed by passing a pulse forward and backwards through the coil.

The coil drive current of the relay 4A need only be passed for 10 ms, and can be provided by the charge recharged to the capacitor 9. For this reason, the phototriac 2 and the capacitor 3 of FIG. 1 are omitted from the constitution of the power section C62.

The same modification is possible in the other embodiments using the phototriac 2 and the capacitor 3, by using a latch-type relay as the switching element for supplying and shutting-off power to the load.

Figure 11:
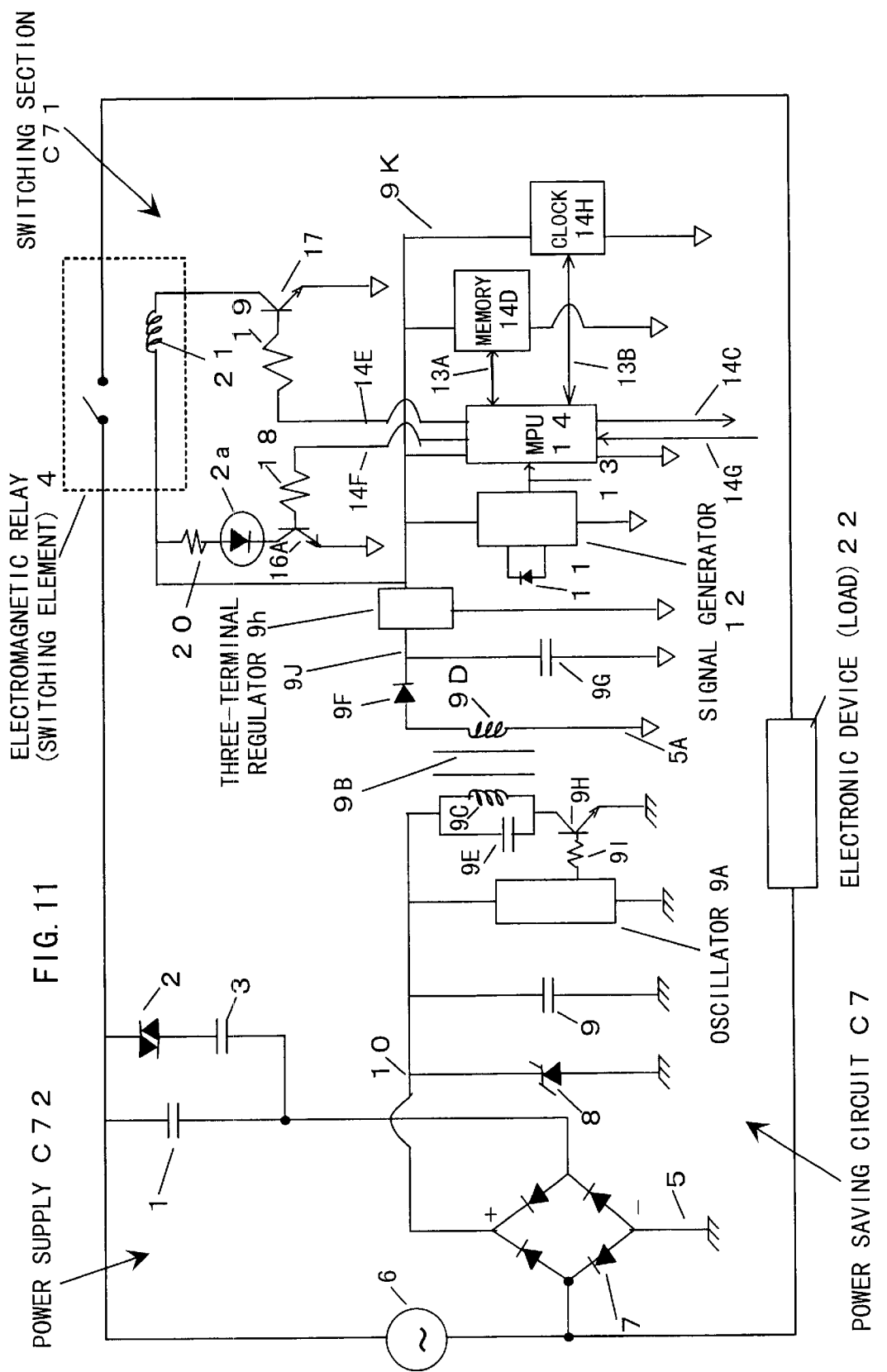
FIG. 11 is a circuit diagram of a power saving circuit according to another embodiment of the present invention.

FIG. 11 shows a power saving circuit C7 according to another embodiment of the present invention.

The power saving circuit C7 has a circuit constitution in which an oscillator 9A is connected in parallel with a capacitor for DC power supply 9 of a power section C72, the output current of the oscillator 9A is supplied via a resistor 9I to the base of a transistor 9H, and current is supplied to a parallel circuit of a capacitor 9E and a primary side coil 9C of a transformer 9B.

The abovementioned parallel circuit comprising the primary side coil 9C and the capacitor 9E resonates at the L-C resonant frequency and the impedance increases, whereby a comparatively high voltage is generated in the primary side coil 9C of the transformer 9B even with a comparatively small current.

Consequently, a corresponding voltage is generated in the secondary side coil 9D of the transformer 9B, rectified by the diode 9F and the capacitor 9G, smoothed, and a DC power supply 9J applied.

The DC power supply 9J is stabilized in a three-terminal regulator 9h to obtain a DC power supply 9K, from which power is supplied to the switching section C71 of the power saving circuit C7.

In this switching section C71, the photodiode 11 of a signal generator 12 comprising an infrared light-receiving section receives an infrared command signal, and generates a command signal 13. The command signal 13 is processed by the MPU 14 and measures corresponding to the content of the command are carried out.

For example, where necessary, the signal 14F via the resistor 18 switches the transistor 16A to ON, passing current to the resistor 20 and the LED 2a. The LED 2a emits light, and consequently the phototriac 2 of the power section C72 switches ON. Excess current is supplied via the capacitor 3 to the bridge 7, thereby increasing the current output capability of the DC power supply 10.

Alternatively, the signal 14E via the resistor 19 switches the transistor 17 to ON, whereby current passes through the control coil 21 of the electromagnetic relay 4, switching the relay 4 to ON.

The MPU 14 passes the signals (or data) 13A and 13B to and from a built-in clock 14H and a memory 14D respectively.

For example, various types of setting conditions and time are stored in the memory 14D and read out therefrom. These are compared with the time and the like from the clock 14H, and the signals 14E, 14F or a signal group 14C are generated and operations executed as required.

In the case where the electronic device 22 is a VTR, when the preset recording time is reached, the signal 14E is output and the relay 4 is switched ON, whereby the electronic device 22 changes to the operating state. The recording state is set by using the appropriate elements of the signal group 14C.

When the photodiode 11 receives the infrared command which has been radiated from the signal generating section of the infrared remote control, the command signal 13 is input to the MPU 14 and processed therein.

In addition to this signal, the MPU 14 processes a group of input signals 14G and executes the corresponding procedures. For example, when a condensation sensor inputs a signal (part of 14G) indicating that condensation has been detected on the video head, the MPU 14 outputs a signal (part of 14C) for switching the heater of the video head to ON and thereby removes the condensation.

The electronic device 22 may be a television, an audio device, a cooling/heating device, or the like. In all these cases, the MPU 14 can be used with predetermined specifications.

The transformer 9B electrically isolates and insulates the secondary side connected components of the MPU 14 and the like from the AC power supply 6. The MPU, the infrared light-receiving section, the memory, the clock and the like in the electronic device 22 may also be isolated.

The arrangement may be such that, when saving power, the MPU 14 (FIGS. 1 and 11) is in a sleep mode in which it consumes current of less than 1 $\mu$A, and, when the signal generator 12 receives a light command, the sleep mode is cancelled in the header of the command signal 13.

The command signal 13 may be input to a signal processing circuit other than the input port of the MPU 14, for example, to a flipflop circuit or the like, the MPU being reset by a signal from this circuit.

Alternatively, the command signal 13 may be received by two input ports of the MPU 14, one of the ports reading the command signal and the other port cancelling the sleep mode. This port avoids duplicating cancellation making receiving impossible after the sleep mode has been cancelled, and is reset when required.

Figure 12:
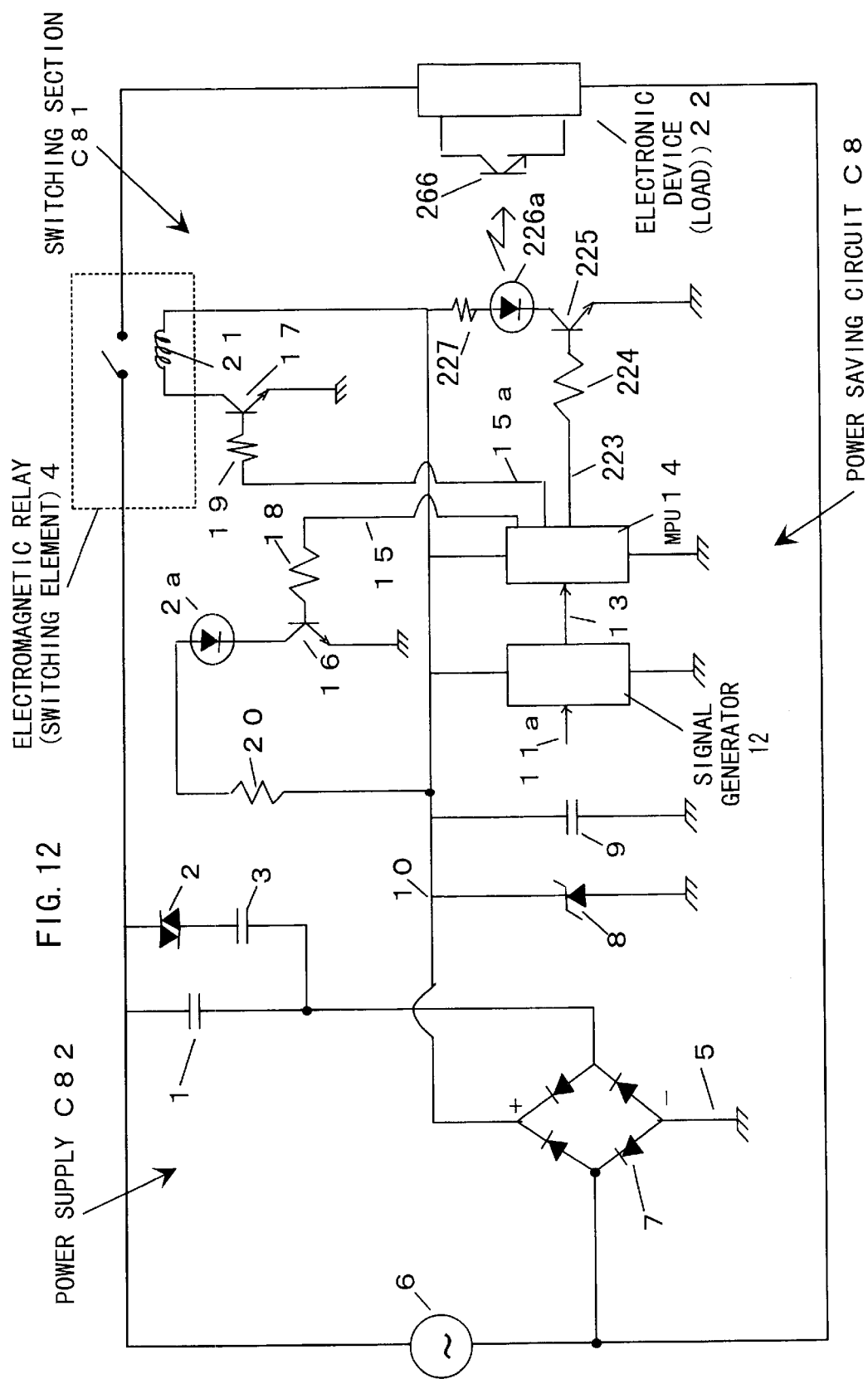
FIG. 12 is a circuit diagram of a power saving circuit according to another embodiment of the present invention.

FIG. 12 shows a power saving circuit C8 according to another embodiment of the present invention.

This power saving circuit C8 comprises photocouplers (226a and 226) appended to the circuit C1 of FIG. 1.

A communications unit which is capable of using infrared command signals, signals for receiving and sending telephone calls, sensor signals, switching signals, and the like, inputs an external command 11a to the switching section C81 of the power saving circuit C8.

The signal generator 12 receives the external command 11a, generates the command signal 13a and inputs it to the MPU 14.

In compliance with the command content of the command signal 13, the MPU 14 outputs a signal 15 to the transistor 16 and switches the phototriac 2 of the power saving section C82 to ON, thereby increasing the DC power supply 10. Furthermore, the MPU 14 outputs the signal 15a to the transistor 17 and switches the AC switching element 4 to ON, supplying the AC power supply 6 to the load 22.

Moreover, in compliance with the command content, the MPU 14 generates a control signal 223 and outputs it via a resistor 224 to a transistor 225. The transistor 225 switches ON and OFF in accordance with the control signal 223, thereby controlling the current passing to the light-emitting side LED 226a of the photocoupler comprising a resistor 227 and switching the LED 226a ON and OFF accordingly.

An electrically isolated method is used for transmitting a corresponding optical command signal to the phototransistor 226 of the photocoupler, transmitting commands in what might be termed an insulated manner to the electronic device 22 which comprises the load. Consequently, the commands in the command content of the signal 11a which are needed for the electronic device 22 are transmitted to the electronic device 22.

This point makes it possible to remove the AC switching element 4 or keep it constantly closed and thereby make that portion a short-circuited path, and to constantly supply the AC power supply 6 to the load 22 side, so that the switching regulator in the load 22 is remotely switched ON and OFF as required by commands which have passed through the photocouplers (226a and 226). With this constitution, the power supply connection to the load 22 can be continued or cut-off in accordance with the specifications of the load side without using an AC switching element 4 such as a relay. The control signal 223 at this time becomes a power supply ON/OFF signal.

Figure 13:
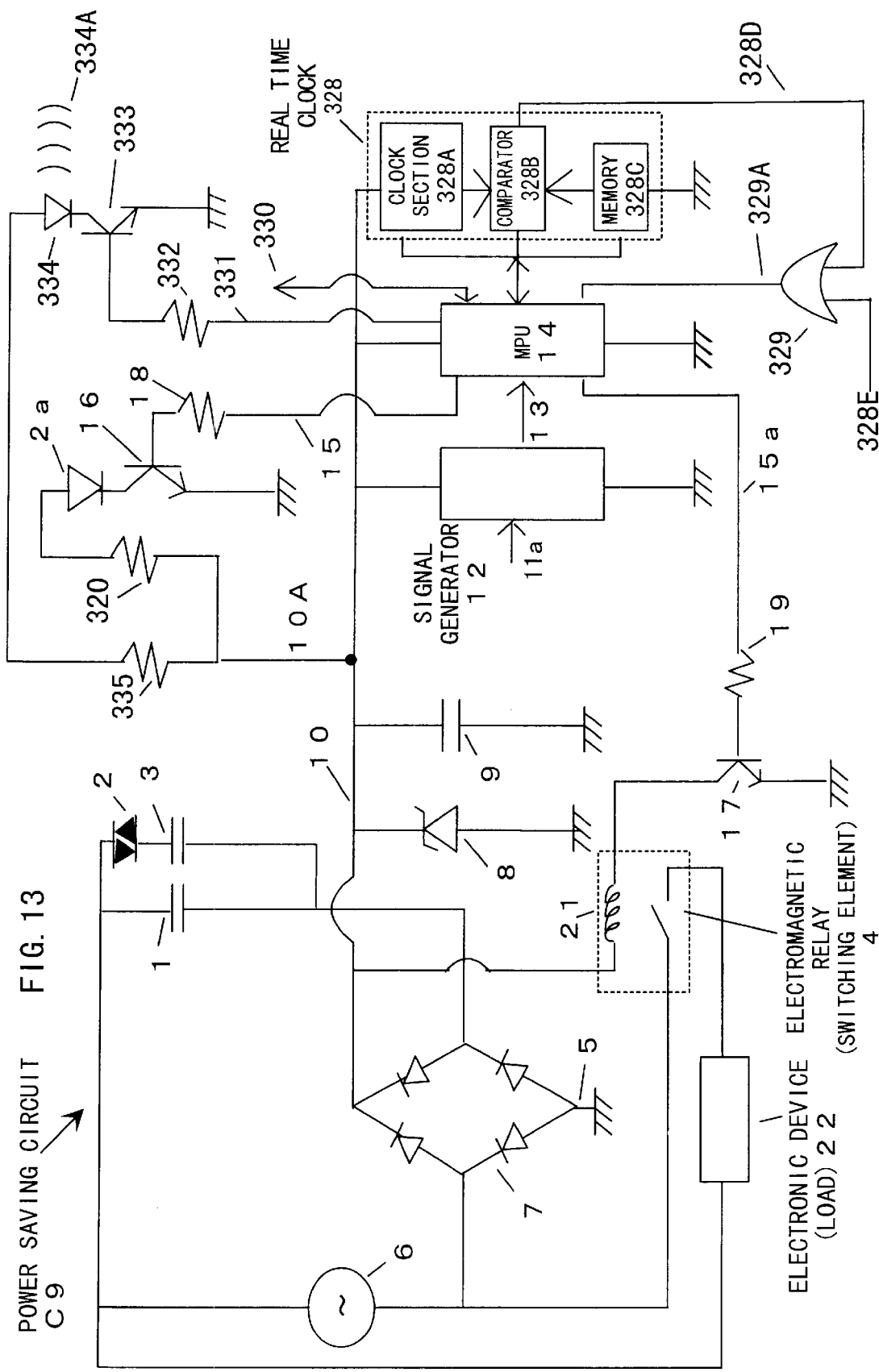
FIG. 13 is a circuit diagram of a power saving circuit according to another embodiment of the present invention.

The power saving circuit C8 may be provided inside the electronic device 22. FIG. 13 shows a power saving circuit C9 according to another embodiment of the present invention.

In the power saving circuit C9, a command signal 331 of the MPU 14 is output via a resistor 332 to a transistor 333, thereby switching the transistor 333 to ON. As a consequence, current passes via a resistor 335 to an infrared LED 334. The LED 334 emits light, and an infrared light command 334A is radiated to the outside.

On the other hand, a comparator 328B compares the date/time of a clock section 328A inside a real-time clock section 328 with a date/time which was stored beforehand in a memory 328C. When both match, the comparator 328B outputs a match signal 328D.

Furthermore, the match signal 328D and a detection signal 328E received from a sensor other than the condensation sensor are input to an OR gate 29, and the signal 329A output from the OR gate is input to the MPU 14.

When at least one of the abovementioned match signal 328D and the detection signal 328E exists, the signal 329A becomes active, shifting the MPU 14 from the sleep mode to the operating mode.

When the signal generator 12 receives an infrared light command 11a from the infrared light commander, the signal generator 12 outputs the signal 13. The signal 13 is input to the MPU 14 which has shifted to the operating mode.

After receiving the signal 13, the MPU 14 transfers signals between the peripheral devices including the LCD display. For example, the MPU 14 inputs and outputs a related signal 330 to/from the LCD. More specifically, the MPU 14 controls the display of the LCD as appropriate. The operator sees this display and inputs the date/hour and the like of the preset time by manipulating the keys. The MPU 14 stores this data in the memory 328C.

Following these predetermined operations, the MPU 14 makes the signals 15 and 15a inactive, thereby switching the phototriac and the AC switching element 4 to OFF, and enters the sleep mode. The current consumed by the MPU 14 in the sleep mode is extremely small.

During the sleep mode, when the signal 329A becomes active, the MPU 14 wakes from the sleep mode and switches the phototriac 2 to ON, increasing the DC power supply 10. Subsequently, the MPU 14 makes the signal 15a active and turns the AC switching element 4 to ON, supplying the AC power supply 6 to the load 22 and shifting the load 22 to the standby state.

The MPU 14 learns the set time from the data stored in the memory 328C and, when that time arrives, outputs a signal 331, whereby the LED 334 radiates an infrared light command 334A to the load 22.

The built-in infrared light-receiving section of the load 22 receives the infrared light command 334A, and starts operations such as recording and the like in accordance therewith.

The load 22 can start recording at the record preset time and end as appropriate even when the load is separate from the housing of the power saving circuit C9.

An appropriate sensor, such as a condensation sensor, is provided to the housing of the power saving circuit C9 and outputs a detection signal 328E in correspondence with the circumstances. Consequently, the MPU 14 can be made to execute operations for the load 22 e.g. preheating the video head.

Figure 14:
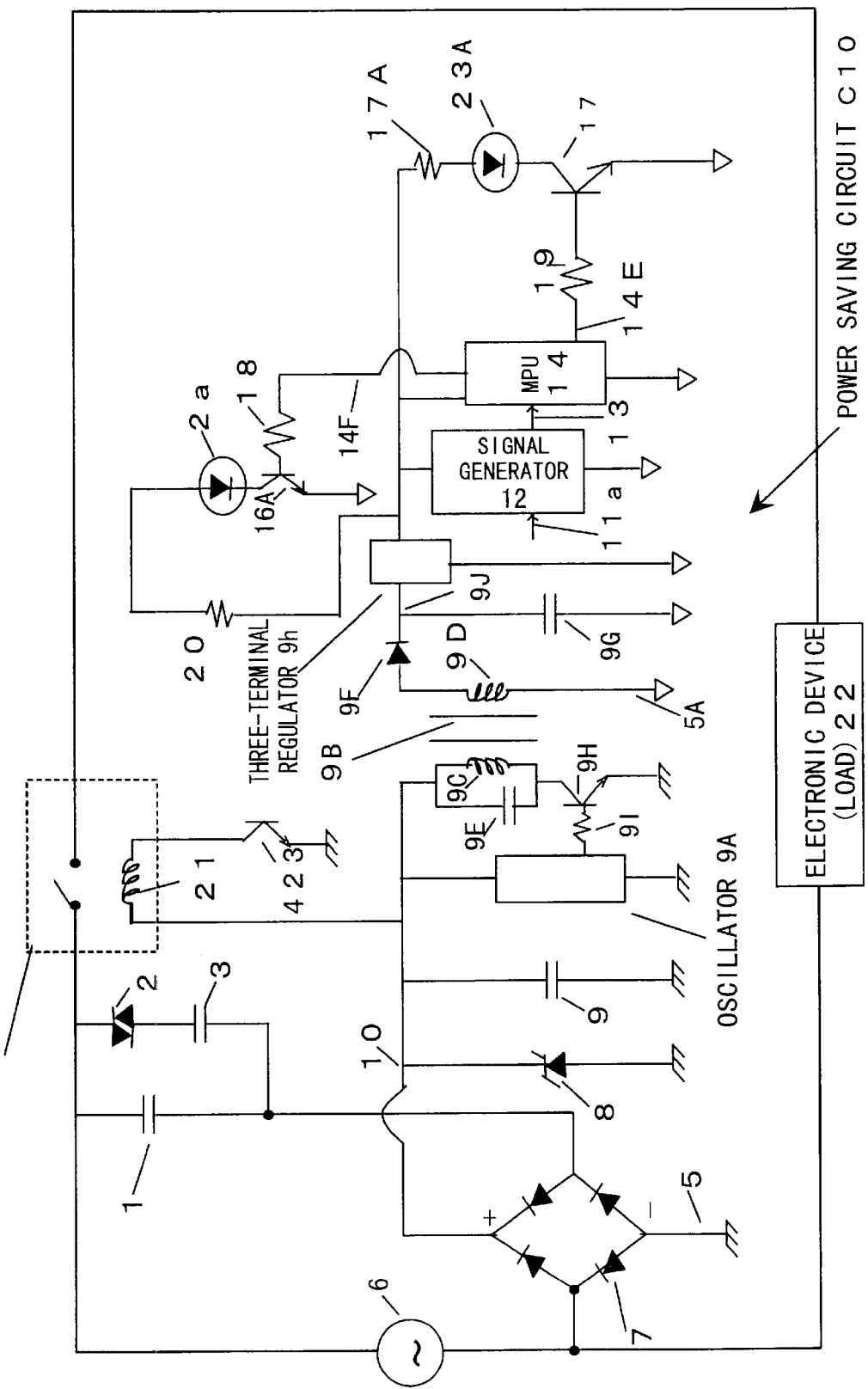
FIG. 14 is a circuit diagram of a power saving circuit according to another embodiment of the present invention.

FIG. 14 shows a power saving circuit C10 according to another embodiment of the present invention.

The power saving circuit C10 uses a signal 11a which is the same as the signal 11a of FIG. 12. When the signal 14E becomes active, the light-emitting side LED 23A of the photocoupler emits light via the resistor 19 and the transistor 17, whereby a phototransistor 423 of the photocoupler turns ON and the relay 4 turns ON. The fact that the relay 4 is on the primary side of the transformer 9B differs from FIG. 11. Reference numeral 17 represents a resistor.

The power saving circuit C10 also comprises the clock 14H and the memory 14D of FIG. 11.

Figure 15:
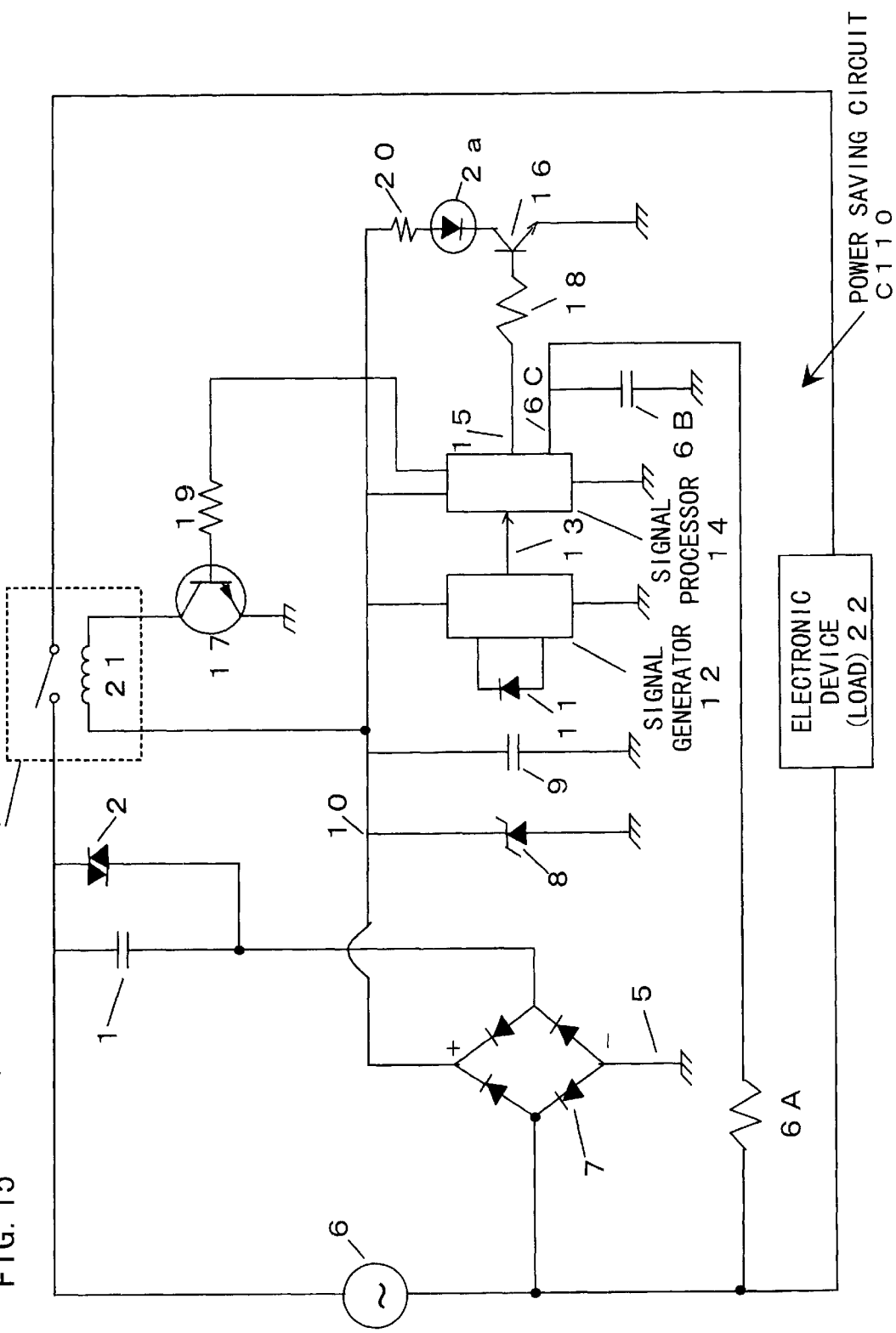
FIG. 15 is a circuit diagram of a power saving circuit according to another embodiment of the present invention.

FIG. 15 shows a power saving circuit C110 according to another embodiment of the present invention.

According to this power saving circuit C110, one part of the voltage of the AC power supply 6 is input from one pole of the AC power supply 6 via a resistor 6A and a capacitor 6B to the MPU 14.

The MPU 14 can identify the zero cross point of the AC power supply 6 and, by activating the signal 15 after a predetermined period of time has elapsed since this zero cross point, can phase-control the phototriac 2 to turn ON. Having turned ON, the phototriac 2 turns OFF at the next zero cross point.

The phototriac 2 differs from the phototriac 2 of FIG. 1 which turns ON at all continuity angles, in that it does not require the capacitor for limiting current 3.

Figure 16:
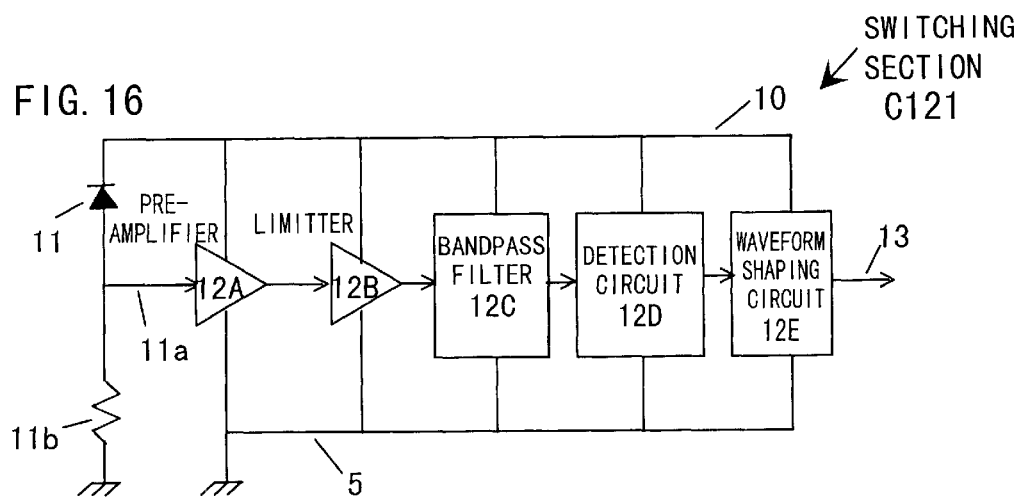
FIG. 16 is a circuit diagram of an essential part of a power saving circuit according to another embodiment of the present invention.

FIG. 16 shows primary parts of a power saving circuit C121 according to another embodiment of the present invention.

In the power saving circuit C121, the photodiode 11 and the resistor 11b are connected in series between the DC power supply 10 and the ground 5.

The photodiode 11 receives the infrared light and generates a detection signal 11a, which is converted to the infrared light command signal 13 via a pre-amplifier 12A, a limitter 12B, a bandpass filter 12C, a detecting circuit 12D, and a waveform shaping circuit 12E.

Figure 17:
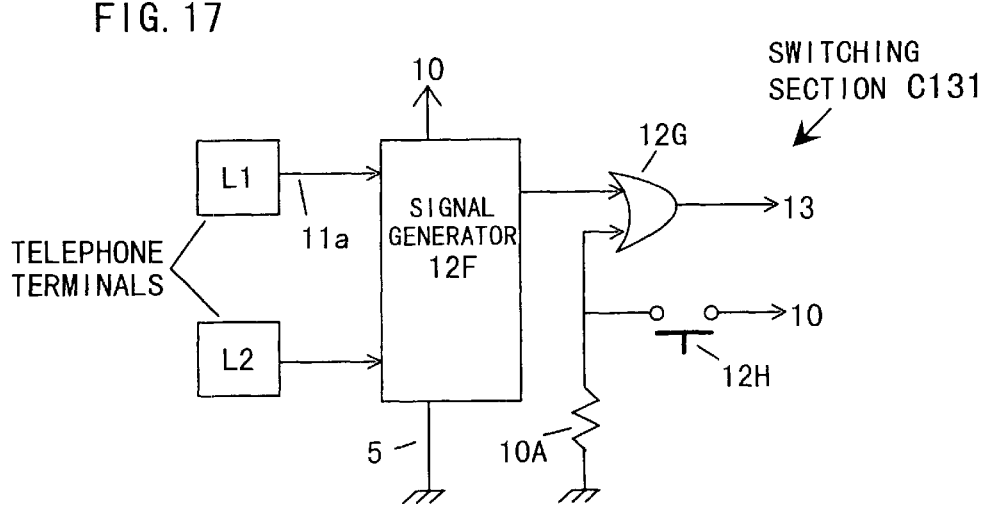
FIG. 17 is a circuit diagram of an essential part of a power saving circuit according to another embodiment of the present invention.

FIG. 17 shows primary parts of a switching circuit C131 according to another embodiment of the present invention.

The switching circuit C131 comprises telephone terminals L1 and L2, a signal generating apparatus 12F for generating a detection signal based on telephone call-received signals 11a which are received from the telephone terminals L1 and L2, and a button switch 12H which is operated when making a telephone call. Reference numeral 10A represents a resistor.

The signal generating apparatus 12F and the button switch 12H input to an OR gate 12G. When a telephone call is received, or when the button switch 12H is pressed while making a telephone call, the OR gate 12G outputs a signal 13 to the MPU.

Figure 18:
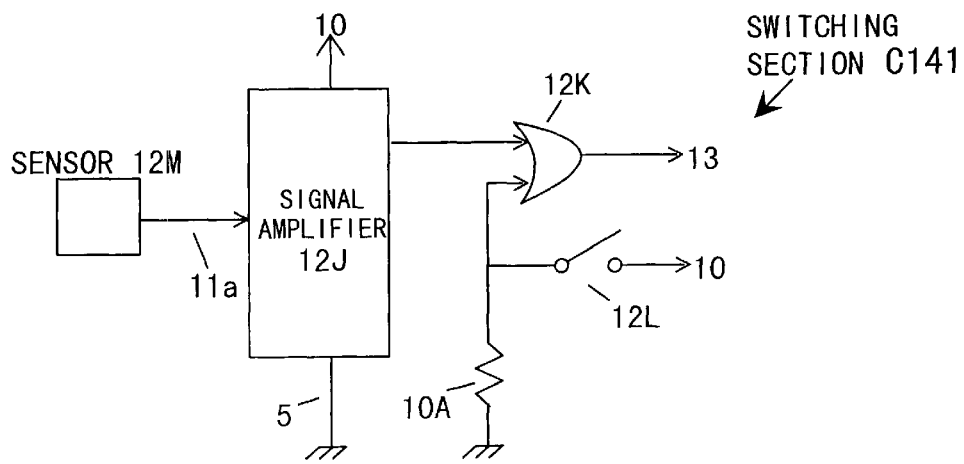
FIG. 18 is a circuit diagram of an essential part of a power saving circuit according to another embodiment of the present invention.

FIG. 18 shows primary parts of a switching section C141 according to another embodiment of the present invention.

The switching section C141 inputs a signal obtained by amplifying the detection signal 11a from the sensor 12M in a signal amplifier 12J, and a closed-path signal of the switch 12L to an OR gate 12K, which outputs a signal 13 to the MPU. Reference numeral 10A represents a resistor.

Figure 19:
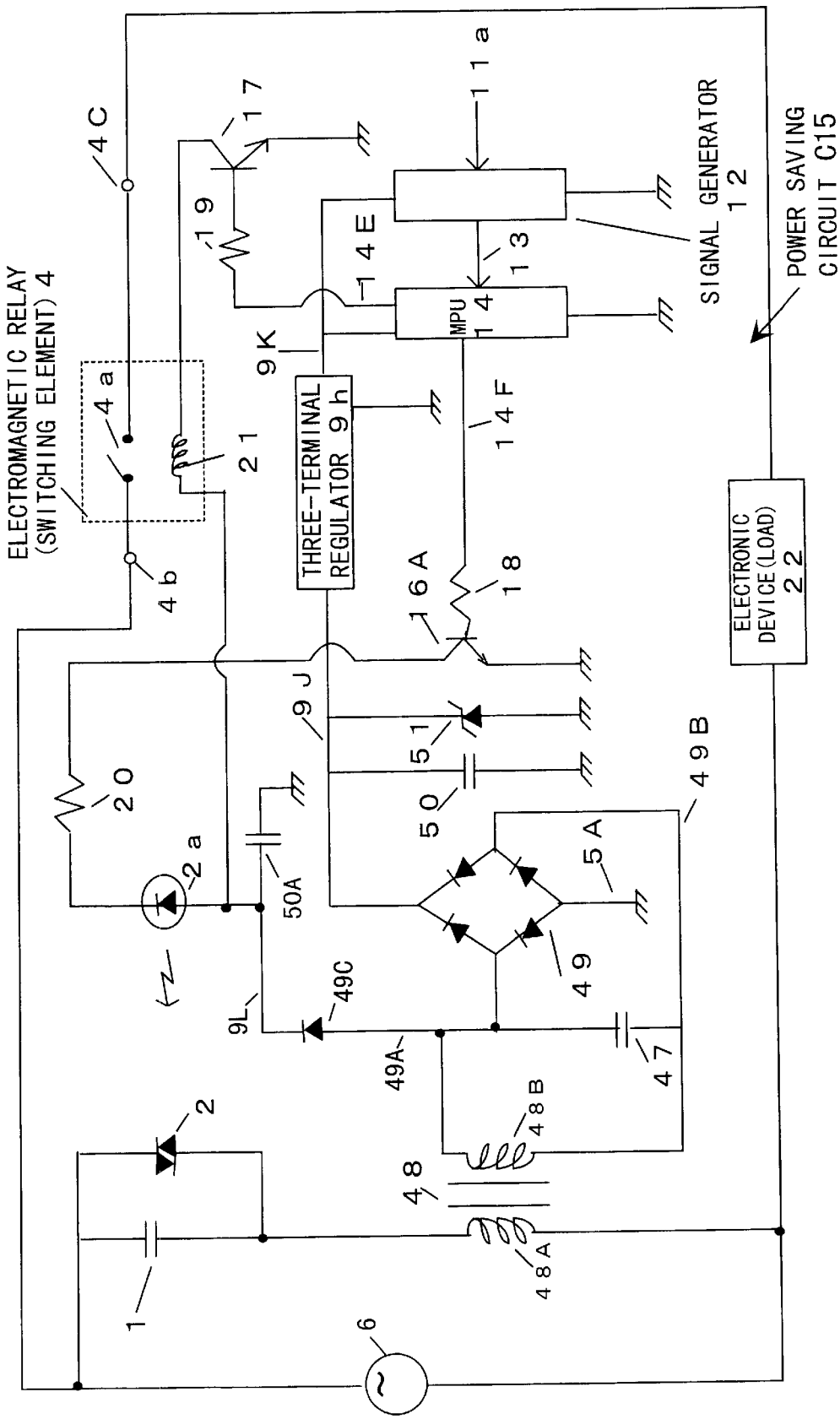
FIG. 19 is a circuit diagram of a power saving circuit according to another embodiment of the present invention.

FIG. 19 shows a power saving circuit C15 according to another embodiment of the present invention.

In the power saving circuit C15, current from one of the poles of the AC power supply 6 passes through a series capacitor 1 and the primary side coil 48A of a power transformer 48, and returns to the other pole of the AC power supply 6.

A voltage, which is determined by the voltage division ratio based on the equivalent impedance when the load side is viewed from the primary side coil 48A of the power transformer 48 and the impedance of the series capacitor 1, becomes the voltage between the terminals of the primary side coil 48A. This voltage is lower than the voltage of the AC power supply 6.

The turn ratio of the primary side coil 48A and the secondary side coil 48B of the power transformer 48 is set to for example 5:1, and the voltage between the terminals of the secondary side coil 48B is reduced even lower than that of the primary side coil 48A. A rectifying bridge 49 rectifies this reduced voltage. A capacitor 50 smoothes the rectified voltage, and the resultant voltage 9J becomes the DC power supply. Reference numeral 5A represents the secondary side ground.

As in FIG. 12, a signal 11a from a source such as an infrared light command, a telephone call receive/transmission, a sensor, and a switch, is input to the signal generator 12. The signal generator 12 outputs a signal 13 to the MPU 14.

A half-wave current is extracted via a diode 49C from one AC terminal 49A of the bridge 49. This current is smoothed by a capacitor 50A to obtained a voltage 9L which is applied to a series circuit comprising the transistor 18 and the light-emitting side LED 2a of the phototriac 2 (AC switching element).

Based on the signal 13, the MPU 14 outputs a signal 14F to the transistor 18. When this signal 14F rises to the high level, the AC switching element 2 turns ON.

The voltage of the terminal 49A of the bridge 49 decreases slightly when current is supplied to the light-emitting side LED 2a of the phototriac 2, but the voltage of the terminal 49B of the bridge 49 does not decrease very much. Consequently, the decrease in the total-wave rectified voltage 9J is slight.

The voltage 9L is used to prevent the total-wave rectified voltage 9J from decreasing.

The capacitor 47 is connected in parallel with the secondary side of the transformer 48, and has the function of increasing the impedance when the secondary side is viewed from the primary coil 48A of the transformer 48.

The presence of the capacitor 47 enables the capacitance of the capacitor 1 to be reduced, and has the effect of reducing the effective power consumption of the entire circuit.

The capacitor 47 can be removed from the constitution. In this case, the capacitance of the capacitor 1 increases slightly.

When the AC switching element 2 turns ON, the current from the AC power supply 6 is passed through the series capacitor 1 and the AC switching element 2 and supplied to the primary coil 48A of the power supply transformer 48. The voltage between the terminals of the primary coil 48A becomes approximately equal to the voltage of the AC power supply 6, and the DC voltage 9L of the secondary side increases. The current output capability is consequently increased, and the AC switching element 2 is kept in the ON state.

When the signal 14F is at the high level, the transistor 16A is turned ON by a base current passing via a resistor 18. The current continues to flow via the resistor 20 to the LED 2a, turning the AC switching element (phototriac 2) to ON.

The Zener diode 51 prevents excessive increase in the DC voltage 9J. When the step-down ratio of the power supply transformer 48 is, for example, 100 v:18 v, the voltage between the terminals of the secondary side coil 48B is 18 v when the voltage between the terminals of the primary side coil 48A is 100 v. When the Zener voltage of the Zener diode 51 is 15 v, the DC voltage 9J does not increase to more than 15 v.

The current flowing to the Zener diode 51 is restricted by the wire wound resistor of the primary coil and secondary coil of the power supply transformer 48, and does not damage the Zener diode 51.

A three-terminal regulator 9h creates a voltage 9K by stabilizing the DC voltage 9J, and supplies it to the MPU 14 or the signal generator 12 and the like. The decrease in the voltage 9J is small when the transistor 16A is ON, keeping the voltage 9K stable.

When the output signal 14E from the MPU 14 rises to high, a base current passes a resistor 19 and is supplied to a transistor 17 which switches ON, whereby the switching element 4 switches ON.

In this example, where the switching element 4 comprises an electromagnetic relay, current flows through the coil 21 of the electromagnetic relay and a connection point 4a becomes ON. This electromagnetic relay 4 may comprise the phototriac shown in FIG. 3.

The current from the AC power supply 6 and the power supply to the load 22 can be controlled by using the output terminals 4b and 4C of the switching element 4.

When the power saving circuit C15 is in standby, it is necessary only to supply the minimum current required to make the MPU 14, the signal generator 12 and the like operative.

Assuming that this current is 5 v, for example, 5.3 v will be sufficient for the voltage 9J, and the voltage between the terminals of the primary coil 48A of the power supply transformer 48 need not be made equal to the voltage of the AC power supply 6. For example, assuming that the transformer has a ratio of 100 v:18 v, approximately 30 vrms would be sufficient as the voltage between the terminals of the primary coil 48A.

When the no-load loss (iron loss+copper loss) is for example 250 mw, the no-load loss at 30 vrms decreases by $(100 \div 30)^2$ (=approximately 1/11.1) to 22.5 mw.

Figure 20:
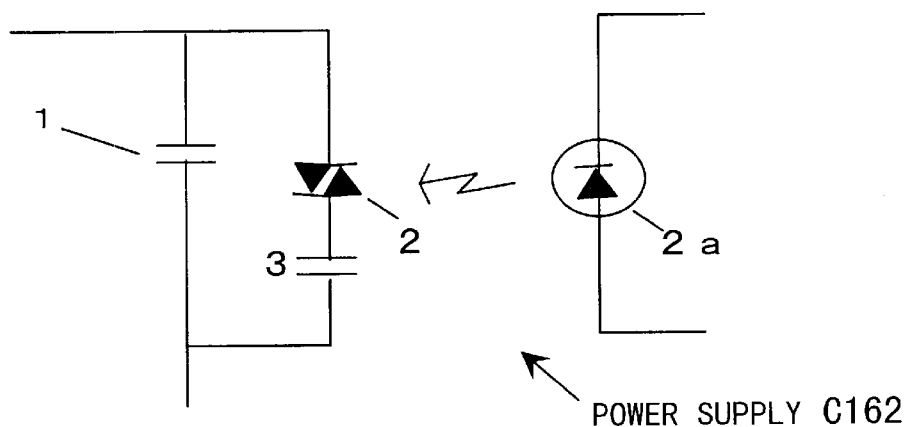
FIG. 20 is a circuit diagram of an essential part of a power saving circuit according to another embodiment of the present invention.

FIG. 20 shows primary parts of a power saving circuit C162 according to another embodiment of the present invention.

The power saving circuit C162 comprises a capacitor 3 connected in series with the AC switching element 2 of FIG. 19. The capacitor 3 restricts current when the AC switching element 2 is ON.

Figure 21:
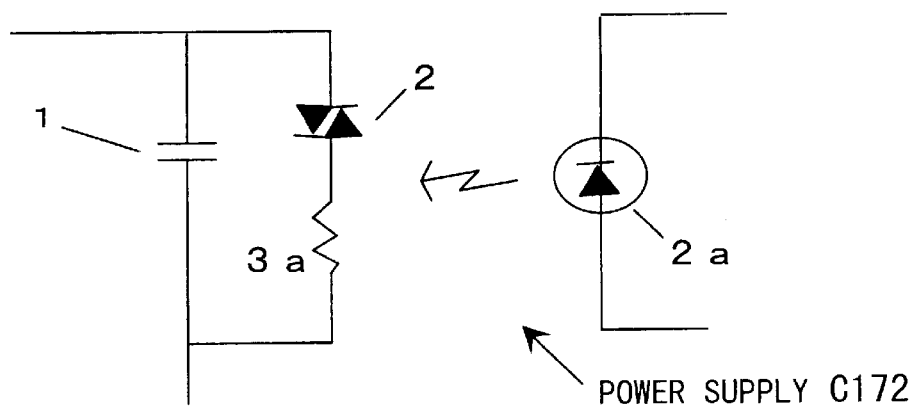
FIG. 21 is a circuit diagram of an essential part of a power saving circuit according to another embodiment of the present invention.

FIG. 21 shows primary parts of a power saving circuit C172 according to another embodiment of the present invention.

The power saving circuit C172 comprises a resistor 3a connected in series with the AC switching element 2 of FIG. 19. The resistor 3a restricts current when the AC switching element 2 is ON.

Figure 22:
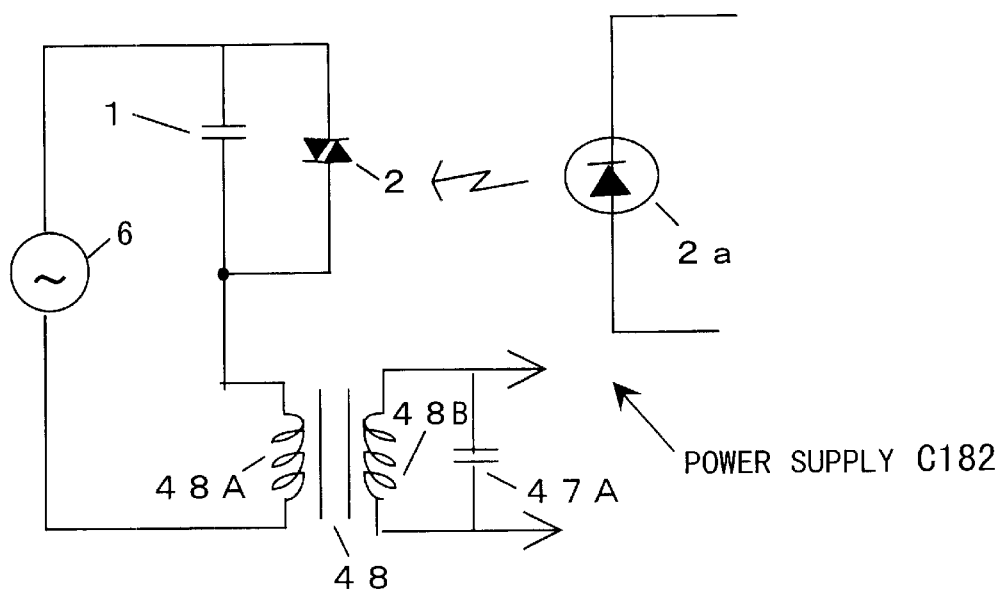
FIG. 22 is a circuit diagram of an essential part of a power saving circuit according to another embodiment of the present invention.

FIG. 22 shows primary parts of a power saving circuit C182 according to another embodiment of the present invention.

The power saving circuit C182 comprises a parallel capacitor 47A which is connected to both terminals of the secondary coil 48B of the power supply transformer 48. When the turn ratio of the primary and secondary coils of the power supply transformer 48 is $N_1:N_2$, connecting the capacitor 47A to both terminals of the secondary coil 48B is equivalent to connected a parallel capacitor having a capacitance of $(N_2+N_1)^2$ times that of the capacitor 47A to both terminals of the primary coil 48A.

Figure 23:
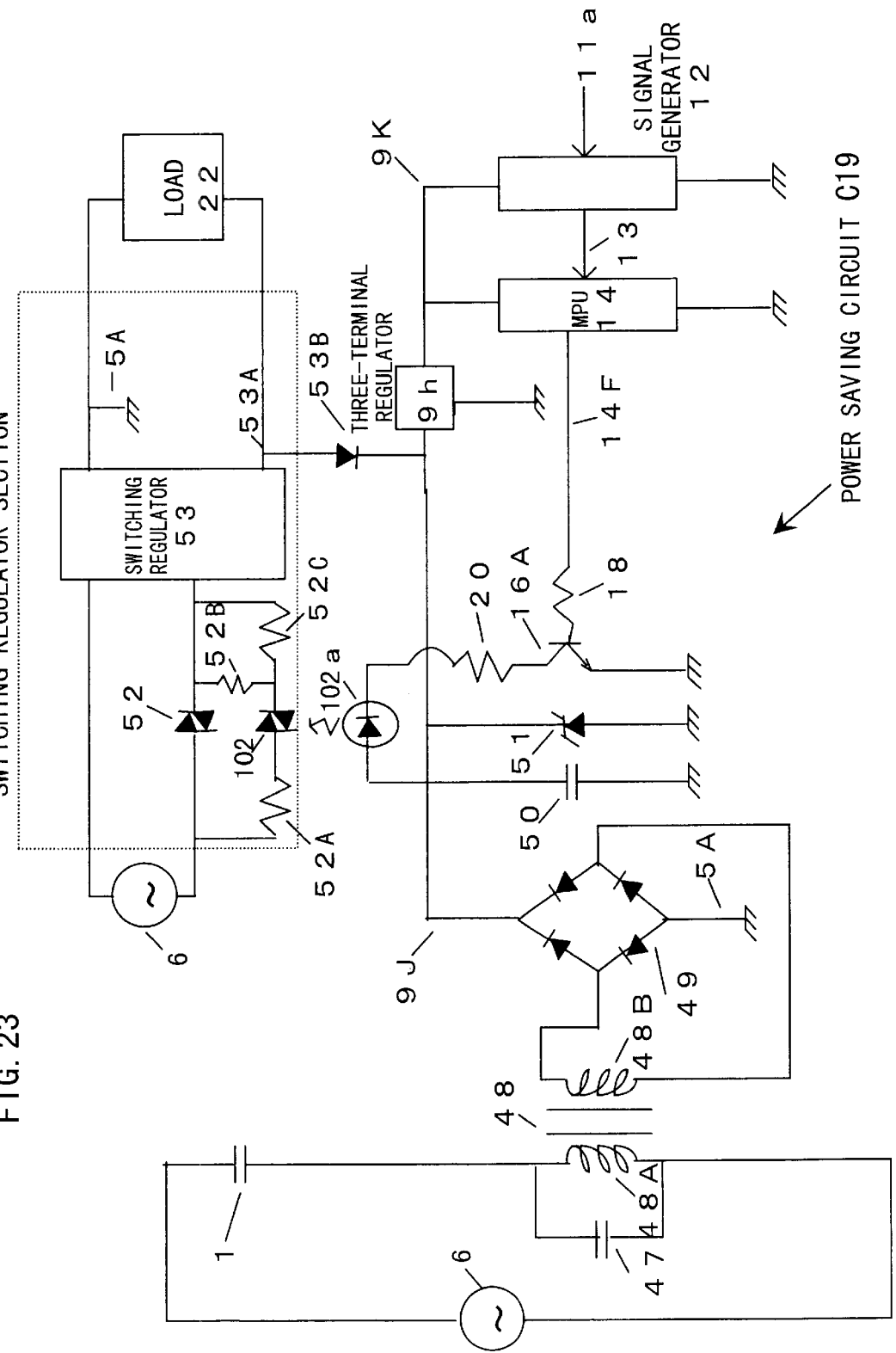
FIG. 23 is a circuit diagram of a power saving circuit according to another embodiment of the present invention.

FIG. 23 shows a power saving circuit C19 according to another embodiment of the present invention.

In the power saving circuit C19, the voltage between the terminals of the primary coil 48A of the power supply transformer 48 is kept lower than the voltage of the AC power supply 6 by using the series capacitor 1 and the parallel capacitor 47.

Furthermore, the input of a switching regulator 53 is controlled by a triac 52. The action of the triac 52 is controlled by an AC switching element comprising a phototriac 102.

When the signal 14F is ON, the light-emitting side LED 102a of the phototriac 102 emits light and turns the triac 52 to ON. The DC output 53A generated by the switching regulator 53 at that time is passed through a diode 53B and added to the voltage 9J, keeping the phototriac 2 in the ON state. Reference numerals 52A, 52B and 52C are resistors.

The DC output 53A may be generated by using a combinations of an insulated transformer and a rectifying circuit instead of using the switching regulator 53. The parallel capacitor 47 can be omitted from the constitution.

The constitutions of the embodiments shown in FIGS. 19 to 23 can be applied in other embodiments wherein the AC power supply 6 and the switching section are not electrically isolated.

For example, in the preceding embodiments excepting those shown in FIGS. 11 and 14, the same type of constitution as those shown in the embodiments of FIGS. 19 to 21 can be achieved by disconnecting the primary side rectifying bridge 7 at its AC terminals, and instead connecting the primary coil 48A of the power supply transformer 48 of FIG. 19, and then connecting the AC terminals of the rectifying bridge 7 to both terminals of the secondary coil 48B of the power supply transformer.

In the embodiments shown in FIGS. 11 and 14, the transformer 9B functions as a switching transformer, and the load side is electrically isolated from the AC power supply 6. However, it is acceptable to omit this transformer 9B, the capacitor 9E, the oscillator circuit 9A, the resistor 9I, the transistor 9H and the like, and insert the transformer 48 of FIG. 19 before the rectifying bridge 7.

The parallel capacitor 47 of FIG. 19 and the parallel capacitor 47A of FIG. 22 act in parallel with the impedance of the primary coil 48A, and have the effect of increasing or decreasing the impedance of the primary coil.

Moreover, the power based on current flowing to the series capacitor 1 or the parallel capacitor 47 is ineffective power, and does not lead to an increase in the no-load loss. This point enables the voltage between the terminals of the primary coil 48A of the power supply transformer 48 to be decreased without increasing the effective loss. The same effect can be achieved when the parallel capacitor 47 is removed from the embodiment of FIG. 19.

Figure 24:
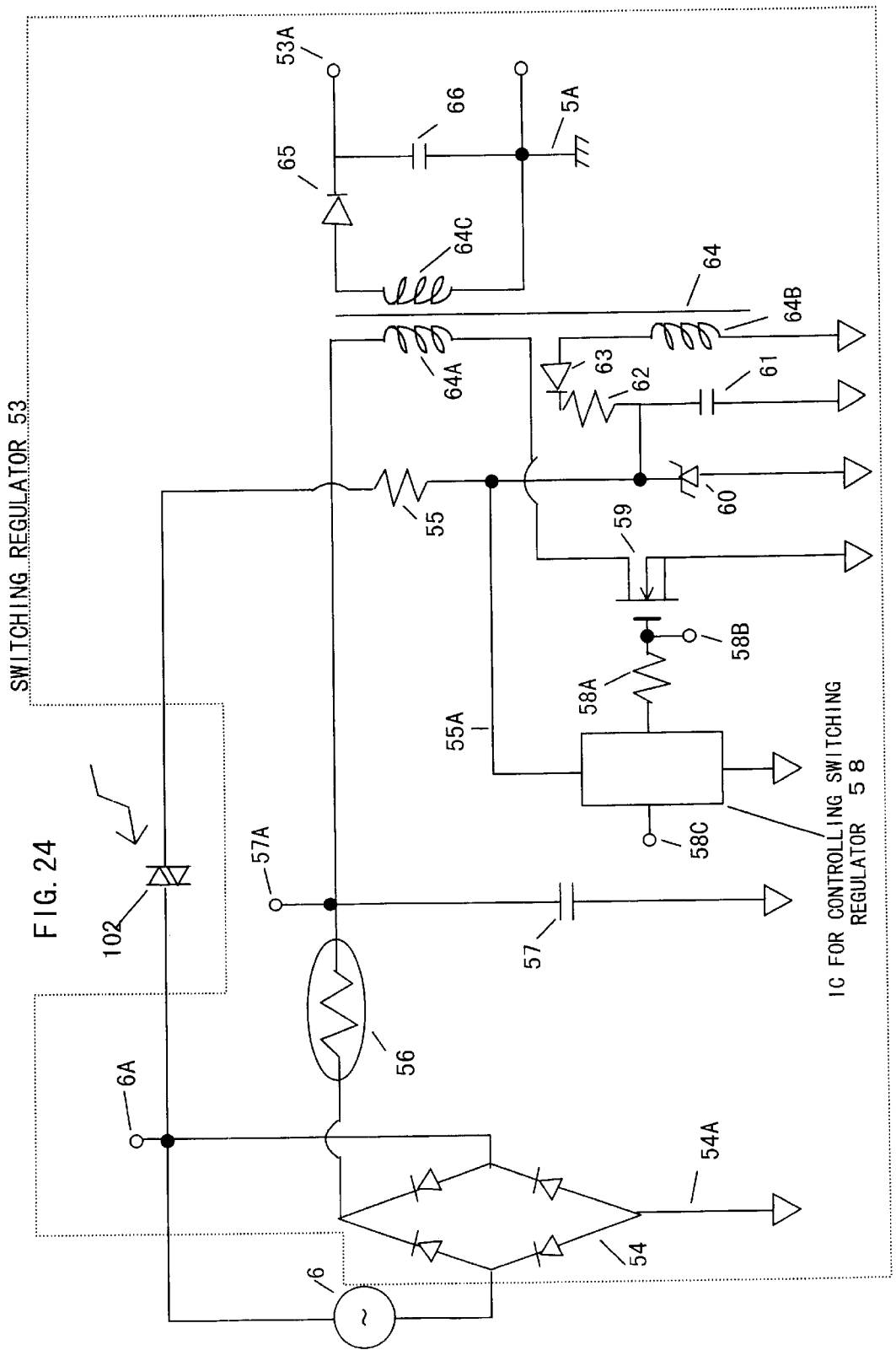
FIG. 24 and FIG. 25 are circuit diagrams of essential parts of modifications of the power saving circuit according to the embodiment of FIG. 23.

FIG. 24 shows the inside of the switching regulator 53 of a power saving circuit according to a modification of the embodiment of FIG. 23.

To form the switching regulator 53, the triac 52 and resistors 52A, 52B, and 53C of FIG. 23 are removed, and the phototriac 102 is connected between an activation resistor 55 and the AC power supply 6A of the bridge 54.

At the zero cross point where the voltage of the AC power supply 6 reaches 0 V, the current flowing to the activation resistor 55 also becomes zero. Accordingly, when the light-emitting side LED 102a of the phototriac shown in FIG. 23 emits light and the phototriac 102 of FIG. 24 is switched ON, current flows through the activation resistor 55 and is rectified by the Zener diode 60 and smoothed by the capacitor 61. This DC voltage is used as the power voltage 55A of the IC for controlling the switching regulator 58.

A pulse created from the output of the IC for controlling 58 is supplied via a resistor 58A to the gate 58B of a switching transistor 59, and the primary side coil 64A of the switching transformer 64 is switched.

The voltage created at the coil 64B of the switching transformer 64 is rectified by a diode 63 and a resistor 62, smoothed by a capacitor 61 and appended to the power voltage 55A.

Furthermore, the voltage created at the secondary coil 64C of the switching transformer 64 is rectified by a diode 65 and a resistor 66, smoothed by a capacitor 66 and becomes the secondary side DC output 53A. Resistor 5A represents a secondary side ground, 54A represents a primary side ground, 56 represents a thermistor for preventing inrush current, and 57 is a smoothing capacitor.

When the phototriac 102 is connected to the terminal 57A of the capacitor 57, the current through the activation resistor 55 does not become zero and the phototriac 102 does not switch OFF, but in FIG. 24, the phototriac 102 is connected to the terminal 6A and turns OFF at the zero cross point. When the light-emitting side LED 102a is OFF, the phototriac 2 turns OFF after the zero cross point.

Thereafter, when the gate 58B of the switching transistor 59 and the control input terminal 58C of the IC for controlling 58 are grounded to the ground 54A by using a photocoupler, the switching transistor 59 stops switching and turns OFF.

Consequently, the secondary DC output 53A of the transformer 64 becomes 0 V.

Figure 25:
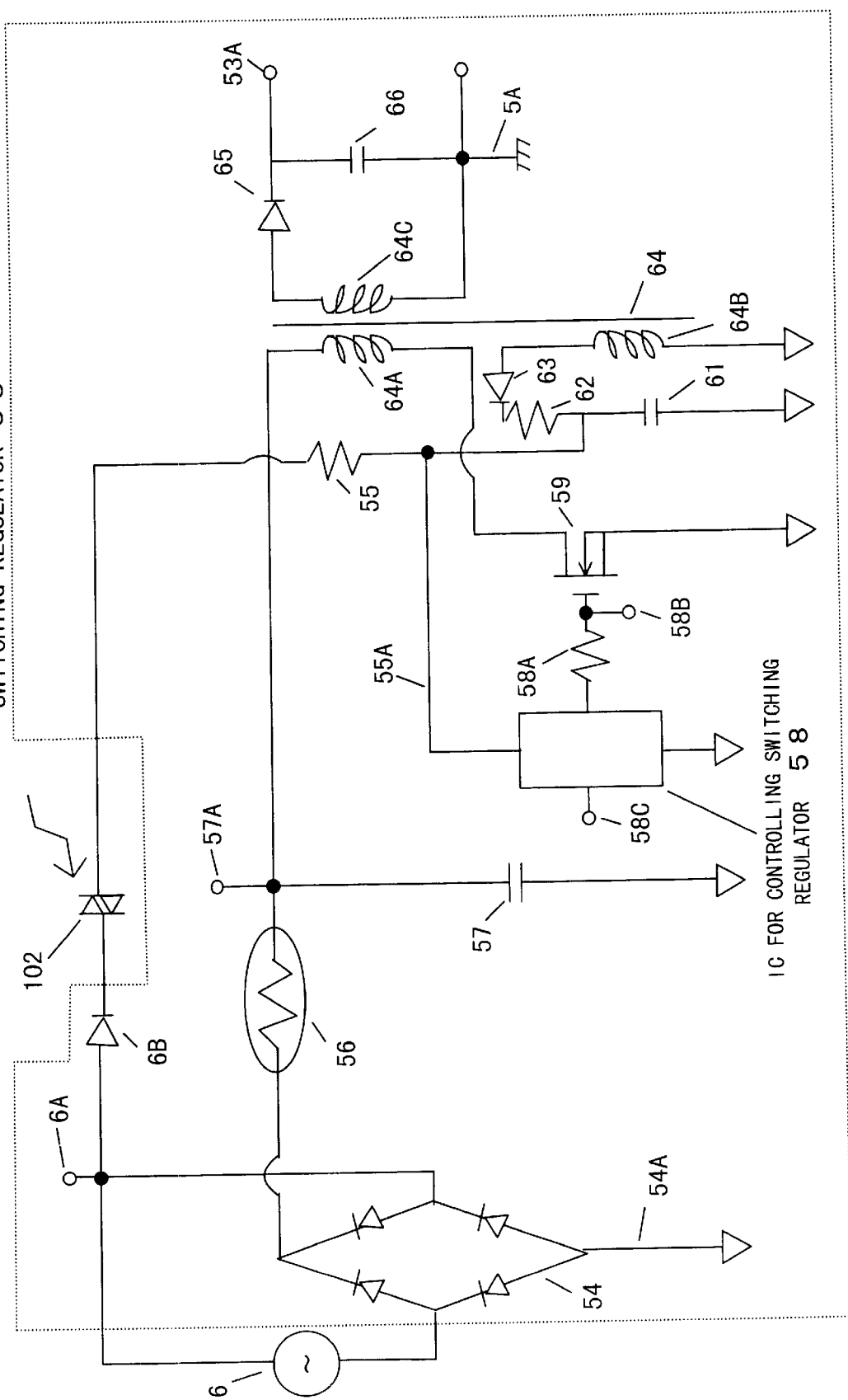

FIG. 25 shows the internal parts of the switching regulator 53 of a power saving circuit according to another modification of the embodiment of FIG. 23.

In this switching regulator 53, the phototriac 102 is connected via a diode 6B to the AC terminal 6A of a bridge 54, and the Zener diode 60 in the modification of FIG. 24 is no longer needed.

Current from the AC terminal 6A is rectified by the diode 6B, smoothed by a capacitor 61 after passing via a resistor 55, and thereby becomes the voltage 55A. The secondary side DC output 53A is created by the same operation as in FIG. 24.

According to the modifications of FIGS. 24 and 25, pulsating current flows to the activation resistor 55. This activation resistor 55 may be provided in a series circuit with the capacitor and a resistor of approximately 100 Ω, whereby the same activation effect is obtained and the resistor of 100 Ω prevents inrush current.

The power supply for standby which creates the DC output 9K of FIGS. 23 and 19 is joined to the switching regulator which constitutes the main power supply of FIGS. 24 and 25. The DC output 9K can be created with comparatively low power. The capacitor reduces the terminal voltage of the primary coil 48a of the miniturized transformer 48.

The DC output 9K is used as a power supply for standby which is comparatively low e.g. 5 V 3 mA or 5 V 30 mA and the like. The DC output 9K of the power supply for standby supplies current to the light-emitting side LED 102a of the phototriac 102.

When the phototriac 102 switches ON, the activation resistor 55 of FIGS. 23 and 24 connects to the AC power supply 6 and activates the DC output 53A of the main power supply.

Even when a heavy load is connected with the DC output 53A of the switching regulator which comprises the main power supply, no current is supplied to the load since the DC output 53A is 0 V in the standby state.

The DC output 9K of the power supply for standby shown in FIG. 23 is generated constantly. However, when the light-emitting side LED 102a of the phototriac 102, which obtains power from the DC output 9K, turns ON and the phototriac 102 turns ON, the standby state ends and the DC output 53A becomes the main power supply.

Since it is possible to return to the standby state without disconnecting the heavy load connected to the DC output 53A of the main power supply, components for disconnecting the load, such as a power transistor, are not needed.

The constitution using the miniturized transformer shown in FIGS. 23 and 19, or the switching regulator of the format shown in FIGS. 11 and 14 or another format, may be used as the "power supply for standby".

Figure 26:
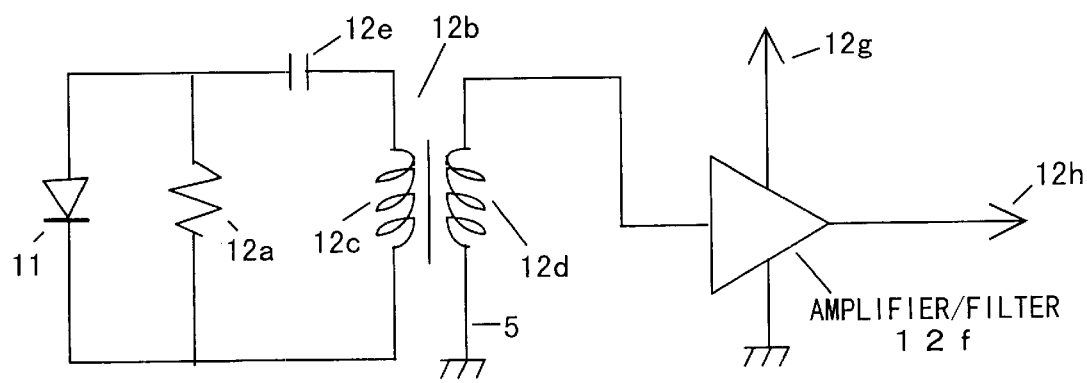
FIG. 26 is a circuit diagram of an essential part of a power saving circuit according to another embodiment of the present invention.

FIG. 26 shows a modification of primary parts of an embodiment comprising the photodiodes 11 and 22 and the infrared light-receiving sections 12 and 22b shown in FIGS. 1, 6, 10, 12, 13, 15, 19, and 23, in contrast with FIG. 16.

The modification of FIG. 26 comprises the photodiode 11 connected in a photo voltaic mode. A voltage corresponding to the infrared light signal radiated to the photodiode 11 is created at the load resistor 12a of the photodiode 11. Signals having high-frequency elements pass the capacitor 12e, creating a voltage between the terminals of the primary side coil 12c and creating an output voltage isolated from the photodiode 11 between the terminals of the secondary coil 12d of the transformer 12b. This output voltage is passed to a filter or an amplifier 12f, and input to the MPU as a command signal 12h comprising command information of an infrared light signal. Reference numeral 5 represents ground, 12g represents the power supply of a filter or an amplifier 12f.

The current consumption to the power supply 12g does not increase when sunlight or lamplight is radiated to the photodiode 11.

In the embodiment of FIG. 16, the photodiode 11 is connected in photo conductive mode, and consequently there is a possibility that the reverse current of the photodiode 11 will increase when sunlight or lamplight are radiated thereto. The reverse current will be supplied from the DC power supply 10, causing an excess current of 1 to 2 mA to be supplied to the photodiode 11. The current capacitance of the DC power supply 10 can be set higher by an equivalent amount.

In FIG. 26, the photodiode 11 is connected in photo voltaic mode. Therefore, there is no excess current and the burden of the power supply is lighter, enabling the current capacitance of the power supply 12g to be set to approximately 200 μA.

Consequently, for example, the infrared light-receiving section 12 can be operated even when the capacitance of the capacitor 1 of FIG. 1 is decreased to give a supply capability of only several hundred μA. As a result, less effective power from the AC power supply 6 is needed to create the DC power supply 10 as the power for standby.

Figure 27:
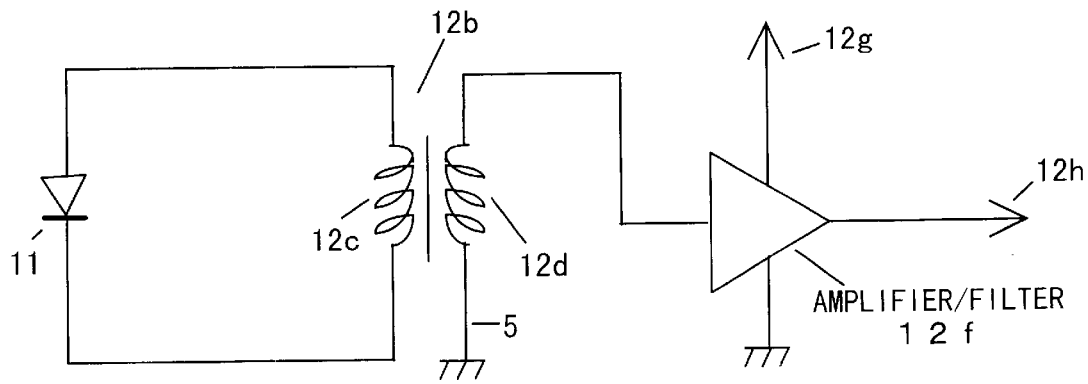
FIG. 27 is a circuit diagram of an essential part of a power saving circuit according to another embodiment of the present invention.

In the modification of FIG. 27, the resistor 12a and capacitor 12e of FIG. 26 are omitted. The light current from the photodiode 11 flows to the primary side coil 12c of the transformer 12b. When the impedance of the coil 12c is L, the high-frequency component $|V|$ of the voltage between the terminals of the coil 12c becomes a comparatively large voltage determined by $|V|=2\pi fL$, and is transmitted to the secondary coil 12d of the transformer. Letter f represents the modulation frequency of the infrared light. When the light is direct light such as sunlight or low-frequency infrared such as lamplight, this does not appear as a large voltage between the terminals of the primary coil 12c of the transformer, but a voltage determined by the DC resistor is created at the primary coil 12c. The ripple to the secondary coil 12d side can practically be disregarded.

The existence of the transformer 12b insulates the signals. Furthermore, the impedance of the primary coil 12c amplifies the high-frequency components of the infrared light signals and attenuates the low-frequency components. Thus the photodiode 11 of FIG. 27 becomes a fixed current source dependent on the amount of light as in FIG. 26. The capacitor 12e of FIG. 26 stops DC portion and the low-frequency components of the light current, and does not send them to the primary coil 12c.

Figure 28:
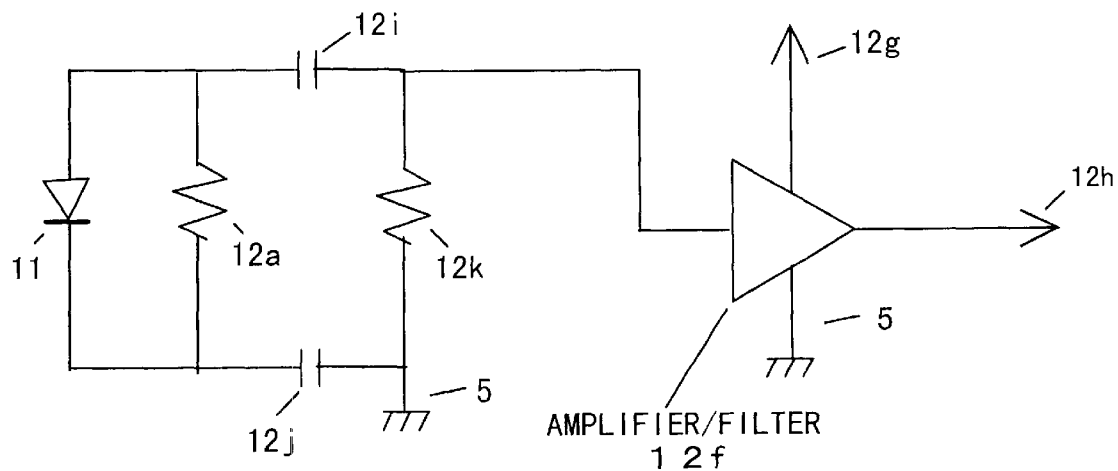
FIG. 28 is a circuit diagram of an essential part of a power saving circuit according to another embodiment of the present invention.

In the modification of FIG. 28, the light current generated from the anode of the photodiode 11, which is connected in photo voltaic mode, flows through a resistor 12a and the AC components of the current return via a capacitor 12i, a resistor 12k, and a capacitor 12j to the cathode of the photodiode 11.

A voltage equivalent to the AC portion of the optical signal radiated to the photodiode 11 is generated at both ends of the resistor 12k. This voltage is amplified by the amplifier 12f. smoothed and extracted as the infrared light command signal 12h.

For example, when a potential to the ground 5 of the DC current supply 12g which is not insulated from the AC power supply 6, such as the DC power supply 10 of FIG. 1, is used as the power supply for the amplifier 12f, the photodiode 11 can be insulated from the AC power supply by the capacitors 12i and 12j.

For example, it is possible to extract the photodiode 11 by approximately 50 cm so as to provide it near to the light-receiving window of the front face of the device, while keeping the remaining components at the rear of the device near the power supply line.

When the AC power supply is 100 Vrms, the photodiode 11 may be effectively isolated from the AC power supply by setting the pressure-resistor of the capacitors 12i and 12j to 250 V and reducing the capacitance to below 4700 pF.

In FIG. 12, a plurality of AC switching elements 4 may be provided and controlled by the MPU 14 in order to realize a multi-link remote control unit which is switched ON by different commands.

Furthermore, it is possible to give the MPU a command learning function, whereby the MPU can respond to different commands from each type of electronic device. Consequently, when a commander for infrared remote control has been lost, another commander can be used to control the device, as long as the software of the MPU of the power saving circuit is compatible with the software of the MPU in the commander.

Figure 29:
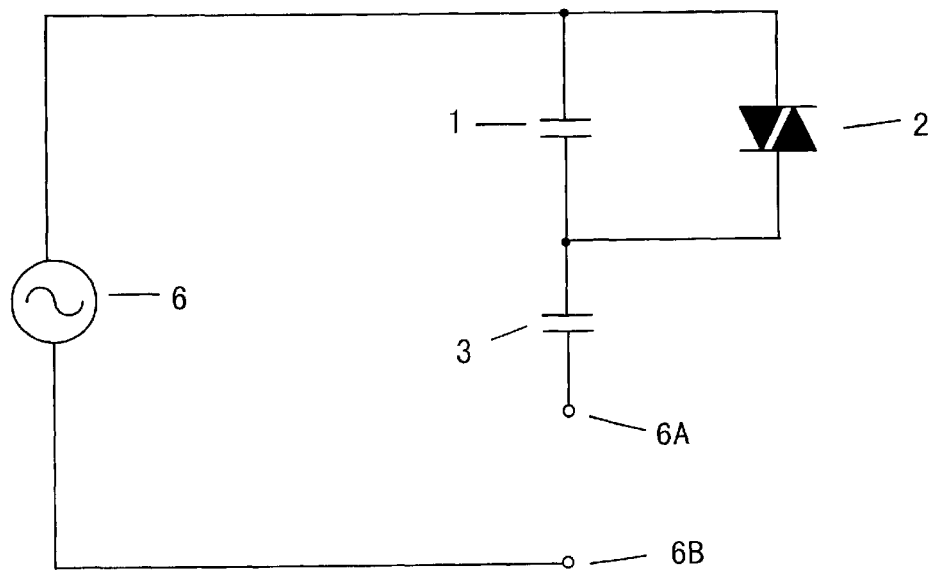
FIG. 29 is a circuit diagram showing an operational principle of the present invention.

FIG. 29 shows an operating principle of power supply section of the power saving circuit according to the present invention. One terminal of a first capacitor 1 is connected to one pole of the AC power supply 6, and the other terminal of the first capacitor 1 is connected to one terminal of a second capacitor 3. The AC voltage, which is generated by shifts in the charge between the other terminal 6A of the second capacitor 3 and the other pole 6B of the AC power supply 6, is used to create a DC power supply. The output terminal of the AC switching element 2, which obtains power for its controller from the DC power supply, is connected in parallel with the first capacitor 1.

In the above explanation, the "high" and "low" states of the signals signify, for example, a level of 3 v, 0 V and the like, or logical high and low and the like. "High" signifies making a certain state active.

The contents shown by logical circuits in order to facilitate understanding may be expressed in a software program and stored in an appropriate memory medium, which can be combined with the electronic device, the MPU, and other units.

INDUSTRIAL APPLICABILITY

The present invention can be applied to electronic devices which require standby power and the present invention is particularly suitable as a power saving circuit for an electronic device having an infrared remote control function, or as a power saving circuit for facsimile and copying machines and the like which have a comparatively long standby time. Furthermore, the present invention is suitable as a power saving circuit for electronic devices comprising a sensor or a switch, or various types of electronic devices which start operating after receiving a trigger signal.

What is claimed is:

1. A power saving circuit comprising:
    a first capacitor (1), one terminal thereof being connected to one pole of an AC power supply (6);
    a rectifying bridge (7), one AC terminal thereof being connected to the other terminal of the first capacitor and another AC terminal thereof being connected to the other pole of said AC power supply;
    a DC power supply (10) obtained by smoothing the DC output of the rectifying bridge;
    a first switching element (4) which obtains power of a control section (21) from the DC power supply;
    a first circuit which connects the first switching element, said AC power supply, and a load (22);
    a second switching element (2) which obtains power of a control section (2a) from the DC power supply;
    a second circuit which connects a series connection between the second switching element and a second capacitor (3) in parallel with said first capacitor;
    a signal source (12; C23; C33);
    a signal processor (14) which processes an input signal (13) which has been input from the signal source;
    a third circuit (17) for activating the control section of said first switching element by using an output signal (15) output from the signal processor, and closing said first circuit to the first switching element;
    a fourth circuit (16) for activating the control section of said second switching element by using an output signal output from the signal processor, and closing said second circuit to the second switching element; and
    a circuit unit for supplying current to said rectifying bridge via said first and second capacitors in accordance with the closing of said second circuit, and injecting a current which is greater than the current required in order to keep the control section of said second switching element active from said rectifying bridge to said DC power supply.

2. The power saving circuit as described in claim 1, wherein one of said first and second switching elements (2, 4) comprises a latching-type electromagnetic relay, a nonlatching-type electromagnetic relay, a triac, or a photocoupler.

3. The power saving circuit as described in claim 1, wherein said signal processor (14) comprises a circuit which outputs said output signal (15) when said input signal (13) has been continuously input for a predetermined period of time, this circuit comprising a differentiating circuit (14b) and an integrator circuit (14c).

4. The power saving circuit as described in claim 1, wherein said signal processor comprises an MPU (14a).

5. The power saving circuit as described in claim 1, wherein said input signal comprises information (132) relating to the size of current (123a) supplied from said first circuit to the load (22); and
    based on this information, said signal processor (14) outputs a control signal (15) which makes the control section (21, 2a) of one of said first and second switching elements (4, 2) inactive.

6. The power saving circuit as described in claim 5, said signal source (C33) comprising
    a detecting section (123, 128, 132) which detects whether the size of said current is greater than a predetermined value (123a); and
    a circuit (133, 129) which stops the detection operation of said detecting section for a predetermined period of time in accordance with said control signal (15).

7. The power saving circuit as described in claim 1, further comprising a housing which houses said DC power supply (10) and said first and second switching elements (4, 2);
    said signal source (C23) comprises a circuit (22u) which is operated by an output obtained from said DC power supply and controlled from outside said housing, and can output a reset signal (15a, 15b);
    said signal processor makes the control sections (21, 2a) of said first and second switching elements (4, 2) inactive in accordance with said reset signal, and cuts off the supply of power from said AC power supply (6) to the load (4, 2).

8. The power saving circuit as described in claim 1, further comprising
    a light-emitting element (226a) which can be controlled from said signal processor (14); and
    a light-receiving element (226) which is provided in said load (22) and receives light signals from said light-emitting element.

9. The power saving circuit as described in claim 1, further comprising
    a housing which houses said DC power supply (10) and said first and second switching elements (4, 2);

an infrared LED (334) which is operated by power obtained from said DC power supply and is capable of radiating infrared light signals (334A) outside the housing; and a circuit (333) which controls this infrared LED in accordance with a signal from said signal processor (14).

10. The power saving circuit as described in claim 1, wherein said signal source comprises a memory (328C) which the date/time is stored in;

a clock (328A) which measures real time; and a comparator (328B) which generates an input signal (328D) to said signal processor when the date/time matches the real time.

11. The power saving circuit as described in claim 1, wherein said signal source (12) comprises one of a first signal generator which receives an infrared light command and generates an input signal to said signal processor;

a second signal generator which generates an input signal to said signal processor in association with the reception or transmission of a telephone call;

a third signal generator which receives a signal from a sensor or a switch and generates an input signal to said signal processor.

12. A power saving circuit comprising:

a first capacitor (1), one terminal thereof being connected to one pole of an AC power supply (6);

a rectifying bridge (7), one AC terminal thereof being connected to the other terminal of the first capacitor and another AC terminal thereof being connected to the other pole of said AC power supply;

a first DC power supply (10) obtained by smoothing the DC output of the rectifying bridge;

an oscillator (9A) which obtains power from the first DC power supply;

a transformer (9B), the primary side coil (9C) thereof being connected to the oscillator;

a second DC power supply (9J) obtained by rectifying and smoothing the voltage of the secondary side coil (9D) of the transformer;

a signal source (12) operated by power from said second DC power supply; and a signal processor (14) which is operated by power from said second DC power supply, and processes a signal (13) input from said signal source and outputs a signal (14E, 14F).

13. The power saving circuit as described in claim 12, further comprising a first switching element (4) comprising a control section (17, 23A, 423, 21) operated by power obtained from at least one of said first and second DC power supplies (10, 9J), and functioning in compliance with a signal (14E) output from said signal processor; and a first circuit which connects the first switching element, said AC power supply (6), and a load (22).

14. The power saving circuit as described in claim 13, further comprising a second switching element (2) comprising a control section (16A, 2a) operated by power obtained from at least one of said first and second DC power supplies (10, 9J), and functioning in compliance with a signal (14F) output from said signal processor; and a second circuit which connects a series connection between the second switching element and a second capacitor (3) in parallel with said first capacitor (1).

15. The power saving circuit as described in claim 14, wherein the signal (13) input from said signal source comprises information relating to an effective value of the voltage of said AC power supply;

said signal processor makes the control sections of at least one of said first and second switching elements (4, 2) inactive based on this information, and cuts off the power supply to the load (22).

16. The power saving circuit as described in claim 1, further comprising a second switching element (2) comprising a control section (16, 2a) operated by power obtained from said DC power supply (10), and functioning in compliance with a signal output from said signal processor (15); and a second circuit which connects the second switching element in parallel with said first capacitor (1); and wherein the signal (13) input from said signal source comprises information relating to the phase of the voltage of said AC power supply; and said signal processor cyclically makes the control section of said second switching element (2) active and inactive based on the information.

17. The power saving circuit as described in claim 12, wherein said signal processor comprises an MPU (14), a memory (14D), and a clock (14H), which receive power from said second DC power supply (9J); and said MPU (14) executes commands stored in said memory (14D) in accordance with time counted by the clock, and generates a signal (14E, 14F) which is output from said signal processor.

18. A power saving circuit comprising:

a first capacitor (1), one terminal thereof being connected to one pole of an AC power supply (6);

a transformer (48), one terminal of a primary side coil (48A) thereof being connected to the other terminal of the first capacitor, the other terminal of the primary side coil being connected to the other pole of said AC power supply;

a first DC power supply (9L; 9J) obtained by rectifying and smoothing the output voltage of a secondary side coil (48B) of the transformer;

a second DC power supply (9K) obtained by rectifying, smoothing, and stabilizing the output voltage of a secondary side coil of the transformer;

a first switching element (4; 52, 53) which closes when a circuit joining said AC power supply (6) to a load (22) turns ON;

a second switching element comprising a control section which obtains power from said first DC power supply, and a switching section (2; 102) which turns ON when the control section (2a; 102a) becomes active;

a signal processor (14) which is operated by power obtained from said second DC power supply (11a, 12), the signal processor processing a signal (13) input from a signal source and makes the control section of said second switching element active, and in addition, outputting a signal (14E, 14F; 14F) for turning said first switching element ON; and a circuit unit which operates in cooperation with said first DC power supply, and keeps said first switching element ON in accordance with the ON operation of the switching section of said second switching element.

19. The power saving circuit as described in claim 18, wherein said circuit unit supplies the current passing through the switching section of said second switching element and said first capacitor (1) to said transformer (48) in correspondence with the ON operation of the switching section (2), increases current output capability of said first DC power supply by raising the voltage of the primary side coil (48A), and thereby enables the first DC power supply (92) to supply a current greater than the current required for keeping the control section (2a) of said second switching element in the active state.

20. The power saving circuit as described in claim 19, said circuit unit comprising
   a circuit which connects said first capacitor (1) in parallel with the switching section (2) of said second switching element; and
   a circuit which connects the secondary side coil (48B) of said transformer (48) in parallel with another capacitor (47).

21. The power saving circuit as described in claim 19, said circuit unit comprising
   a circuit which connects the switching section (2) of said second switching element in series with a resistor (3a) and a second capacitor (3); and
   a circuit which connects this circuit in parallel with said first capacitor (1).

22. The power saving circuit as described in claim 18, wherein the switching section of said second switching element comprises a phototriac (102), and the control section comprises a light-emitting side LED of the phototriac (102a); and
   said circuit unit comprises
   a switching regulator which connects one terminal of a series circuit connecting the output terminal of said phototriac (2) in series with a resistor (55) to one pole of said AC power supply (6), and obtains a power supply voltage (55A) from an IC (58) for controlling a switching regulator (53) by rectifying and smoothing the voltage produced at the other terminal of the series circuit; and
   a circuit which makes the switching regulator start its switching operation by making the light-emitting side LED (2a) emit light, turning the phototriac (2) ON.

23. The power saving circuit as described in claim 18, wherein
   the switching section of said second switching element comprises a phototriac (102), and the control section comprises a light-emitting side LED (102a) of the phototriac; and
   said circuit unit comprises
   a switching regulator (53) which connects one terminal of a series circuit connecting the output terminal of said phototriac (2) in series with a diode (6B) and a resistor (55) to one pole of said AC power supply (6), and obtains a power supply voltage (55A) from an IC (58) for controlling a switching regulator by rectifying and smoothing the voltage produced at the other terminal of the series circuit; and
   a circuit which makes the switching regulator start its switching operation by making the light-emitting side LED (2a) emit light, turning the phototriac (2) ON.

24. The power saving circuit as described in claim 22, further comprising another capacitor connected in series with said resistor.

25. The power saving circuit as described in claim 23, further comprising another capacitor connected in series with said resistor.

26. The power saving circuit as described in claim 1, wherein said signal source comprises a signal generator (12) which connects one terminal of a photodiode (11) connected in photo voltaic mode to one terminal of a primary side coil (12c) of an insulated transformer (12b), connects the other terminal of the primary side coil to the other terminal of said photodiode (11), and extracts an infrared light command signal (12h) by increasing and smoothing the voltage which is generated between the terminals of a secondary side coil (12d) of said insulated transformer (12b).

27. The power saving circuit as described in claim 26, further comprising
   a resistor (12a) which is connected in parallel with said photodiode (11); and
   another capacitor (12e) which is provided between one terminal of said photodiode and one terminal of the primary side coil (12c) of said insulated transformer (12b).

28. The power saving circuit as described in claim 1, wherein said signal source comprises a signal generator which connects a photodiode (11) connected in photo voltaic mode in parallel with a resistor (12a), connects one terminal of the resistor to one terminal of another capacitor (12i), and connects another terminal of the resistor (12a) to one terminal of yet another capacitor (12j), and extracts an infrared light command signal (12h) by increasing and smoothing the voltage which is generated between said other capacitor and the other terminal of said yet another capacitor (12j).

29. A power saving circuit which connects one pole of an AC power supply (6) to one terminal of a first capacitor (1), and creates a DC power supply (10; 9J; 9C) by using the AC voltage produced between the other terminal of the first capacitor (1) and the other pole of said AC power supply (6); connects the output terminal of an AC switching element (2), which obtains power for a control section from the DC power supply (10; 9J; 9C), in series with a second capacitor (3); and connects the series connection between the AC switching element (2) and the second capacitor (3) in parallel with said first capacitor (1).

30. A power saving circuit which connects one pole of an AC power supply (6) to one terminal of a first capacitor (1), connects the other terminal of the first capacitor (1) to one terminal of a second capacitor (3), and creates a DC power supply (10; 9J; 9L) by using the AC voltage produced between the other terminal (6A) of the second capacitor (3) and the other pole (6B) of said AC power supply (6); connects the output terminal of an AC switching element (2), which obtains power for a control section from the DC power supply (10; 9J; 9L), in parallel with said first capacitor (1).

31. A power saving circuit comprising
   a first circuit which supplies an AC power supply (6) to an electronic device (22);
   a DC power supply (10), obtained from the apparent power of said AC power supply;
   a first switch (4) which is provided in said first circuit and can be shifted to a closed state by the power from said DC power supply;
   a power supply circuit (9) which increasing the power of said DC power supply in order to maintain the closed state of said first switch;
   a second circuit (3) which supplies power from said AC power supply power to said power supply circuit; and
   a second switch (2) which is provided in said second circuit and can be shifted to a closed state by the power from said DC power supply.

* * * * *